United States Patent
Kwong et al.

(10) Patent No.: US 11,412,283 B1
(45) Date of Patent: Aug. 9, 2022

(54) SYSTEM AND METHOD FOR ADAPTIVELY STREAMING VIDEO

(71) Applicant: City University of Hong Kong, Kowloon (HK)

(72) Inventors: Sam Tak Wu Kwong, Kowloon (HK); Xuekai Wei, Kowloon (HK); Mingliang Zhou, Chongqing (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/241,265

(22) Filed: Apr. 27, 2021

(51) Int. Cl.
  *H04N 21/24* (2011.01)
  *H04N 21/2662* (2011.01)
  *G06N 20/00* (2019.01)
  *H04N 21/845* (2011.01)
  *H04N 21/4784* (2011.01)

(52) U.S. Cl.
  CPC ......... *H04N 21/2662* (2013.01); *G06N 20/00* (2019.01); *H04N 21/2402* (2013.01); *H04N 21/2407* (2013.01); *H04N 21/4784* (2013.01); *H04N 21/8456* (2013.01)

(58) Field of Classification Search
  None
  See application file for complete search history.

(56) References Cited

U.S. PATENT DOCUMENTS

| | | | |
|---|---|---|---|
| 9,954,717 B2 | 4/2018 | Giladi | |
| 10,057,277 B2 | 8/2018 | Wang et al. | |
| 10,454,985 B2 | 10/2019 | Stockhammer et al. | |
| 10,587,934 B2 | 3/2020 | Wang | |
| 2014/0040498 A1* | 2/2014 | Oyman | H04L 43/0811 709/231 |
| 2014/0119432 A1* | 5/2014 | Wang | H04N 19/87 375/240.2 |

(Continued)

FOREIGN PATENT DOCUMENTS

| | | | | |
|---|---|---|---|---|
| CN | 106576182 | | 5/2020 | |
| EP | 2480001 A2 * | | 7/2012 | ......... H04L 41/5067 |

(Continued)

OTHER PUBLICATIONS

C. Ge and N. Wang. Real-time qoe estimation of dash-based mobile video applications through edge computing. In IEEE INFOCOM 2018, pp. 766-771, Apr. 2018.

(Continued)

*Primary Examiner* — Nasser M Goodarzi
*Assistant Examiner* — Terrika Peterson
(74) *Attorney, Agent, or Firm* — Renner Kenner Greive Bobak Taylor & Weber

(57) ABSTRACT

System and method for adaptively streaming a video. The method includes obtaining a first segment of a video file with a first bitrate and video quality level, and, after obtaining the first segment of the video file, determining, using a controller with a trained reinforcement-learning-based adaptive streaming model, a second bitrate and video quality level of a second segment of the video file to be obtained. The method also includes obtaining the second segment of the video file with the second determined bitrate and video quality level. The method may be repeated for different segments of the video file so as to adaptively stream the video represented by the video file.

27 Claims, 23 Drawing Sheets

(56) References Cited

U.S. PATENT DOCUMENTS

| | | | |
|---|---|---|---|
| 2016/0105338 A1* | 4/2016 | Fletcher | G06F 11/321 709/224 |
| 2017/0078447 A1 | 3/2017 | Hancock et al. | |
| 2017/0353516 A1* | 12/2017 | Gordon | H04N 21/2402 |
| 2020/0059683 A1* | 2/2020 | Grigsby | H04L 12/1881 |
| 2020/0311881 A1* | 10/2020 | Lanman | G06T 7/11 |
| 2020/0314503 A1* | 10/2020 | Wang | H04L 65/607 |
| 2020/0351378 A1 | 11/2020 | Shribman et al. | |
| 2021/0329256 A1* | 10/2021 | Wang | H04N 19/119 |

FOREIGN PATENT DOCUMENTS

| | | |
|---|---|---|
| EP | 3284239 | 2/2018 |
| JP | 6487076 | 3/2019 |
| JP | 6698755 | 5/2020 |

OTHER PUBLICATIONS

M. Gadaleta, F. Chiariotti, M. Rossi, and A. Zanella. D-dash: A deep q-learning framework for dash video streaming. IEEE Transactions on Cognitive Communications and Networking, 3(4)703-718, Dec. 2017.

M. Hongzi, N. Ravi, and A. Mohammad. Neural adaptive video streaming with pensieve. In Proceedings of the Conference of the ACM Special Interest Group on Data Communication, SIGCOMM '17, pp. 197-210, New York, NY, USA, 2017. ACM.

R. K. P. Mok, W. Li, and R. K. C. Chang. Irate: Initial video bitrate selection system for http streaming. IEEE Journal on Selected Areas in Communications, 34(6):1914-1928, Jun. 2016.

Y. Liu, S. Dey, F. Ulupinar, M. Luby, and Y. Mao. Deriving and validating user experience model for dash video streaming. IEEE Transactions on Broadcasting, 61(4):651-665, Dec. 2015.

* cited by examiner

Algorithm 1 Training strategy of the proposed ABR method

Initialization: Factor discounting future reward, $\gamma$; Learning rate of the actor, $\alpha_{actor}$; Learning rate of the critic, $\alpha_{critic}$; Hyper-parameter $\beta$; Training dataset, $TD$.

Output: Parameters of actor and critic network, $\theta$ and $\omega$.

1: Initialize the parameters $\theta$ and $\omega$;
2: repeat
3:   for each network trace in $TD$ do
4:     Initialize $s_0$;
5:     for $i = 1$ to $N$ do
6:       Select quality level ($rate_{i+1}, eq_{i+1}$) by $a_i$ obtaining reward $r_{i+1}$;
7:       Retrieve $s_{i+1}$;
8:       Update TD error with Eq. (17);
9:       Update $\omega$ with Eq. (14);
10:      Update $\theta$ with Eq. (18);
11:     end for
12:   end for
13: until Reward no longer increases.
14: return $\theta$ and $\omega$.

Figure 11

| | Method | Average QoE | Average bitrate (Mbps) | Video quality (SSIM) | Playback stalling Length (s) | Quality changing amplitude (SSIM) |
|---|---|---|---|---|---|---|
| QoE objective of (2,1,1,1) | BB | 107 | 1.074111 | 0.94709 | 1.85 | 0.08286 |
| | RB | 173 | 0.876855 | 0.93718 | 1.38 | 0.06726 |
| | MPC | 118 | 1.069667 | 0.94578 | 1.46 | 0.08256 |
| | Pensieve | 167 | 1.447773 | 0.94830 | 1.42 | 0.06060 |
| | Proposed | 206 | 1.122281 | 0.94880 | 1.40 | 0.06049 |
| QoE objective of (1,2,1,1) | BB | 11 | 1.137515 | 0.94860 | 1.84 | 0.08936 |
| | RB | 19 | 0.925839 | 0.93832 | 1.67 | 0.06630 |
| | MPC | 46 | 1.398048 | 0.94864 | 1.42 | 0.06946 |
| | Pensieve | 43 | 1.138473 | 0.94808 | 1.73 | 0.07403 |
| | Proposed | 68 | 1.126885 | 0.94830 | 1.59 | 0.07302 |
| QoE objective of (1,1,2,1) | BB | 70 | 1.260084 | 0.95339 | 1.83 | 0.06533 |
| | RB | 69 | 1.063192 | 0.94472 | 1.40 | 0.06198 |
| | MPC | 64 | 1.441147 | 0.95169 | 1.64 | 0.06523 |
| | Pensieve | 72 | 1.239386 | 0.95237 | 1.74 | 0.05667 |
| | Proposed | 95 | 1.226342 | 0.95360 | 1.54 | 0.05676 |

Figure 13

| | Method | Average QoE | Average bitrate (Mbps) | Video quality (SSIM) | Playback stalling Length (s) | Quality changing amplitude (SSIM) |
|---|---|---|---|---|---|---|
| QoE objective of (2,1,1,1) | BB | 247 | 1.073 | 0.95215 | 1.88 | 0.06837 |
| | RB | 204 | 0.851 | 0.93993 | 1.33 | 0.06948 |
| | MPC | 217 | 1.687 | 0.94061 | 1.50 | 0.08525 |
| | Pensieve | 259 | 1.427 | 0.95213 | 1.38 | 0.06897 |
| | Proposed | 261 | 1.072 | 0.95246 | 1.39 | 0.06885 |
| QoE objective of (1,2,1,1) | BB | 20 | 1.136 | 0.95319 | 1.85 | 0.07107 |
| | RB | 39 | 0.802 | 0.94112 | 1.33 | 0.06658 |
| | MPC | 57 | 1.391 | 0.95287 | 1.42 | 0.07095 |
| | Pensieve | 68 | 1.135 | 0.94481 | 1.68 | 0.07722 |
| | Proposed | 93 | 1.125 | 0.95350 | 1.41 | 0.07710 |
| QoE objective of (1,1,2,1) | BB | 101 | 1.278 | 0.95780 | 1.87 | 0.06680 |
| | RB | 80 | 1.033 | 0.94764 | 1.35 | 0.06427 |
| | MPC | 99 | 1.488 | 0.95636 | 1.54 | 0.06658 |
| | Pensieve | 104 | 1.234 | 0.95469 | 1.75 | 0.05823 |
| | Proposed | 129 | 1.212 | 0.95820 | 1.85 | 0.05924 |

Figure 14

| Time interval    | 0-70  | 70-170 | 170-270 | 270-320 |
|------------------|-------|--------|---------|---------|
| Bandwidth (Mbps) | 20.00 | 10.00  | 5.00    | 20.00   |

Figure 19

|         |             | BB     | RB     | MPC    | Pensieve | Proposed |
|---------|-------------|--------|--------|--------|----------|----------|
| x265    | JFI         | 0.9967 | 0.9979 | 0.9968 | 0.9971   | 0.9977   |
|         | Average QoE | 48     | 34     | 51     | 58       | 64       |
| *C. Zhou| JFI         | 0.9970 | 0.9983 | 0.9973 | 0.9975   | 0.9978   |
|         | Average QoE | 60     | 50     | 66     | 77       | 86       |

Figure 20

*C. Zhou, C. Lin, X. Zhang, and Z. Guo. Tfdash: A fairness, stability, and efficiency aware rate control approach for multiple clients over dash. *IEEE Transactions on Circuits and Systems for Video Technology*, 29(1):198–211, Jan 2019.

SYSTEM AND METHOD FOR ADAPTIVELY STREAMING VIDEO

TECHNICAL FIELD

The invention relates to systems and methods for adaptively streaming video.

BACKGROUND

Given the rapid advancement in multimedia and communication technologies, online sharing of videos have become increasingly attractive to both the research and industrial communities. To provide low-latency and high-quality online video services, several adaptive bitrate streaming (ABS) techniques, such as Adobe® HTTP Dynamic Streaming (HDS), Apple® HTTP Live Streaming (HLS), Microsoft® Smooth Streaming (MSS) and MPEG® Dynamic Adaptive Streaming over HTTP (DASH), have been proposed.

Some of these existing adaptive bitrate streaming systems may provide consumers with higher quality videos using less processing resources. When the adaptive bitrate streaming system operates properly, end users, e.g., video viewers, should enjoy high-quality video playback without notable interruption.

SUMMARY OF THE INVENTION

In a first aspect, there is provided a method for adaptively streaming a video. The method comprising: obtaining a first segment of a video file with a first (e.g., determined) bitrate and video quality level; after obtaining the first segment of the video file, determining, using a controller with a trained reinforcement-learning-based adaptive streaming model, a second bitrate and video quality level of a second segment of the video file to be obtained; and obtaining the second segment of the video file with the second determined bitrate and video quality level. The first and second segments of the video file are consecutive and/or continuous segments of a video represented by the video file.

In one embodiment of the first aspect, the determining comprises: detecting parameters related to segment download state and playback state associated with the video file; and processing the detected parameters using the trained reinforcement-learning-based adaptive streaming model to determine the second bitrate and video quality level.

In one embodiment of the first aspect, the parameters comprises at least some of or all of: video quality level of the obtained first segment; current buffer length or time; current freezing length or time; download time required and corresponding bitrate for past duration (e.g., immediate past k seconds, where k can be any number larger than 1) of the video represented by the video file; and available video quality level set and available bitrate set of the second segment. Other parameters may be included, depending on the implementation. Preferably, the trained reinforcement-learning-based adaptive streaming model does not directly use a predicted network throughput in the determination of the second bitrate and video quality level.

In one embodiment of the first aspect, the trained reinforcement-learning-based adaptive streaming model is trained or established using a deep deterministic policy gradient based algorithm.

In one embodiment of the first aspect, the trained reinforcement-learning-based adaptive streaming model is trained or established based at least in part on a reward function associated with a quality of experience of a viewer of the video. Optionally, the reward function takes into account, at least, video quality level of a segment of the video file, video quality level variations between adjacent segments, and playback freezing events. Optionally, the reward function is arranged to apply respective weightings to video quality level of a segment of the video file, video quality level variations between adjacent segments, and playback freezing events. In one example, the weightings are adjustable based on user input and/or properties of the video file so as to optimize among high instantaneous video quality level, constant video quality level, and smooth playback of the video represented by the video file.

In one embodiment of the first aspect, the method further comprising receiving user input associated with adjustment of one or more of the weightings.

In one embodiment of the first aspect, the reward function is defined as:

$$\alpha_{qoe}vq_i - \beta_{qoe}|vq_i - vq_{i-1}| - \gamma_{qoe}F_i - \delta_{qoe}\text{FRP}_i,$$

where $\alpha_{qoe}$, $\beta_{qoe}$, $\gamma_{qoe}$ and $\delta_{qoe}$ are weighting parameters, $vq_i$ is video quality level of the ith video segment (e.g., average structural similarity index (SSIM) of the ith segment), $\text{FRP}_i$ is a freezing risk penalty parameter, and $F_i$ is freezing length or time.

In one embodiment of the first aspect, the first and second determined video quality levels are each represented by structural similarity index or indices. For example, the first video quality level is represented by an average structural similarity index of the first segment; and the second determined video quality level is represented by an average structural similarity index of the second segment.

In one embodiment of the first aspect, obtaining the first segment of the video file comprises: transmitting a request to obtain the first segment of the video file with the first bitrate and video quality level; and receiving the first segment of a video file with the first bitrate and video quality level. In one example, obtaining the first segment of the video file includes downloading (e.g., from a server) the first segment of the video file with the first bitrate and video quality level, and the determination is performed after the first segment is fully downloaded (e.g., upon the first segment being fully downloaded).

In one embodiment of the first aspect, obtaining the second segment of the video file comprises: transmitting a request to obtain the second segment of the video file with the second determined bitrate and video quality level; and receiving the second segment of the video file with the second determined bitrate and video quality level. In one example, obtaining the second segment of the video file includes downloading (e.g., from a server) the second segment of the video file with the second determined bitrate and video quality level.

In one embodiment of the first aspect, the first bitrate and/or video quality level may be the same as the second determined bitrate and/or video quality level.

In one embodiment of the first aspect, the first bitrate and/or video quality level may be the different from the second determined bitrate and/or video quality level.

In one embodiment of the first aspect, the method further comprises: processing the obtained first segment of the video file; and playing, based on the processing, the first segment of the video. Optionally, the processing and/or playing are performed at least partly during the determination of the second bitrate and video quality level of the second segment of the video file to be obtained.

In one embodiment of the first aspect, the method further comprises: processing the obtained second segment of the video file; and playing, based on the processing, the second segment of the video.

In one embodiment of the first aspect, the method further comprises: parsing a media presentation description file including records of properties of the video file. The media presentation description file may contain, among other things, records of available bitrates and video quality levels for each predetermined duration of a video represented by the video file (divided into segments including, at least, the first and second segments). Optionally, the video quality level is represented by structural similarity index or indices (SSIM). Optionally, a duration of the first segment of the video file includes multiple said predetermined duration. Optionally, a duration of the second segment of the video file includes multiple said predetermined duration. The duration of the first and second segments may be the same or different. Optionally, each predetermined duration correspond to a duration of one segment of the video file. Optionally, each predetermined duration is one second. The duration of the first segment and/or the duration of the second segment may be more than one second.

In one embodiment of the first aspect, the method further comprises: receiving (e.g., from a server) the media presentation description file prior to parsing.

In one embodiment of the first aspect, the adaptive streaming of the video is performed using dynamic Adaptive Streaming over HTTP (DASH).

The above features in the method of the first aspect for the first and second segments of the video file can be adapted and applied to the second and third video segments of the video file, the third and fourth video segments of the video file, etc., e.g., for the entire video file. Preferably, the first, second, third, fourth, etc. segments are consecutive and/or continuous segments of a video represented by the video file. As such, in a second aspect, there is provided a method for adaptively streaming a video. The method comprising: after obtaining a segment of a video file with a determined bitrate and video quality level, determining, using a controller with a trained reinforcement-learning-based adaptive streaming model, bitrate and video quality level of the next segment of the video file to be obtained; obtaining the next segment of the video file with the determined bitrate and video quality level determined for the next segment; and repeating the determining and obtaining steps for all subsequent segments of the video file so as to adaptively stream (play) a video represented by the video file. The method may further include streaming the video.

In a third aspect, there is provided a system for adaptively streaming a video. The system includes one or more client devices arranged to: obtain a first segment of a video file with a first (e.g., determined) bitrate and video quality level; determine, using a controller with a trained reinforcement-learning-based adaptive streaming model, a second bitrate and video quality level of a second segment of the video file to be obtained after the first segment of the video file is obtained; and obtain the second segment of the video file with the second determined bitrate and video quality level. The first and second segments of the video file are consecutive and/or continuous segments of a video represented by the video file.

In one embodiment of the third aspect, the one or more client devices are arranged to determine the second bitrate and video quality level of the second segment of the video file to be obtained by (at least): detecting parameters related to segment download state and playback state associated with the video file; and processing the detected parameters using the trained reinforcement-learning-based adaptive streaming model to determine the second bitrate and video quality level.

In one embodiment of the third aspect, the parameters comprises at least some of or all of: video quality level of the obtained first segment; current buffer length or time; current freezing length or time; download time required and corresponding bitrate for past duration (e.g., immediate past k seconds, where k can be any number larger than 1) of the video represented by the video file; and available video quality level set and available bitrate set of the second segment. Other parameters may be included, depending on the implementation. Preferably, the trained reinforcement-learning-based adaptive streaming model does not directly use a predicted network throughput in the determination of the second bitrate and video quality level.

In one embodiment of the third aspect, the trained reinforcement-learning-based adaptive streaming model is trained or established using a deep deterministic policy gradient based algorithm. Optionally, the one or more client devices are arranged to train or establish the trained reinforcement-learning-based adaptive streaming model.

In one embodiment of the third aspect, the trained reinforcement-learning-based adaptive streaming model is trained or established based at least in part on a reward function associated with a quality of experience of a viewer of the video. Optionally, the reward function takes into account, at least, video quality level of a segment of the video file, video quality level variations between adjacent segments, and playback freezing events. Optionally, the reward function is arranged to apply respective weightings to video quality level of a segment of the video file, video quality level variations between adjacent segments, and playback freezing events. In one example, the weightings are adjustable based on user input and/or properties of the video file so as to optimize among high instantaneous video quality level, constant video quality level, and smooth playback of the video represented by the video file.

In one embodiment of the third aspect, the one or more client devices are arranged to receive user input to adjust one or more of the weightings.

In one embodiment of the third aspect, the reward function is defined as:

$$\alpha_{qoe} vq_i - \beta_{qoe} |vq_i - vq_{i-1}| - \gamma_{qoe} F_i - \delta_{qoe} \text{FRP}_i$$

where $\alpha_{qoe}$, $\beta_{qoe}$, $\gamma_{qoe}$ and $\delta_{qoe}$ are weighting parameters, $vq_i$ is video quality level of the ith video segment (e.g., average SSIM of the ith segment), $\text{FRP}_i$ is a freezing risk penalty parameter, and $F_i$ is freezing length or time.

In one embodiment of the third aspect, the first and second determined video quality levels are each represented by structural similarity index or indices. For example, the first video quality level is represented by an average structural similarity index of the first segment; and the second determined video quality level is represented by an average structural similarity index of the second segment.

In one embodiment of the third aspect, the one or more client devices are arranged to obtain the first segment of the video file by (at least): transmitting a request to obtain the first segment of the video file with the first bitrate and video quality level; and receiving the first segment of a video file with the first bitrate and video quality level. In one example, the one or more client devices are arranged to download (e.g., from a server) the first segment of the video file with the first bitrate and video quality level, and the determination is performed after the first segment is fully downloaded (e.g., upon the first segment being fully downloaded).

In one embodiment of the third aspect, the one or more client devices are arranged to obtain the second segment of the video file by (at least): transmitting a request to obtain the second segment of the video file with the second determined bitrate and video quality level; and receiving the second segment of the video file with the second determined bitrate and video quality level. In one example, the one or more client devices are arranged to download (e.g., from a server) the second segment of the video file with the second determined bitrate and video quality level.

In one embodiment of the third aspect, the first bitrate and/or video quality level may be the same as the second determined bitrate and/or video quality level.

In one embodiment of the third aspect, the first bitrate and/or video quality level may be the different from the second determined bitrate and/or video quality level.

In one embodiment of the third aspect, the one or more client devices and/or one or more video players associated with the one or more client devices are further arranged to: process the obtained first segment of the video file; and play, based on the processing, the first segment of the video. Optionally, the one or more client devices and/or the one or more video players are arranged to perform the processing and/or playing at least partly during the determination of the second bitrate and video quality level of the second segment of the video file to be obtained.

In one embodiment of the third aspect, the one or more client devices and/or one or more video players associated with the one or more client devices are further arranged to: processing the obtained second segment of the video file; and playing, based on the processing, the second segment of the video.

In one embodiment of the third aspect, the one or more client devices are further arranged to: parse a media presentation description file including records of properties of the video file. The media presentation description file may contain, at least, records of available bitrates and video quality levels for each predetermined duration of a video represented by the video file (divided into segments including, at least, the first and second segments). Optionally, the video quality level is represented by structural similarity index or indices (SSIM). Optionally, a duration of the first segment of the video file includes multiple said predetermined duration. Optionally, a duration of the second segment of the video file includes multiple said predetermined duration. The duration of the first and second segments may be the same or different. Optionally, each predetermined duration correspond to a duration of one segment of the video file. Optionally, each predetermined duration is one second. The duration of the first segment and/or the duration of the second segment may be more than one second.

In one embodiment of the third aspect, the one or more client devices are further arranged to: receive (e.g., from a server) the media presentation description file prior to parsing.

In one embodiment of the third aspect, adaptive streaming of the video is performed using dynamic Adaptive Streaming over HTTP (DASH). The client device may be a DASH client. The server may be a DASH server. The video player may be a DASH media player that can be implemented using hardware and/or software. The video player may be integrated with the client device.

The above features in the system of the third aspect for the first and second segments of the video file can be adapted and applied to the second and third video segments of the video file, the third and fourth video segments of the video file, etc., e.g., for the entire video file. Preferably, the first, second, third, fourth, etc. segments are consecutive and/or continuous segments of a video represented by the video file. As such, in a fourth aspect, there is provided a system for adaptively streaming a video. The system comprises one or more client devices arranged to: determine, using a controller with a trained reinforcement-learning-based adaptive streaming model, bitrate and video quality level of the next segment of the video file to be obtained; obtain the next segment of the video file with the determined bitrate and video quality level determined for the next segment; and repeat the determination and obtain steps for all subsequent segments of the video file so as to adaptively stream (play) a video represented by the video file. The system may further include one or more video play associated with the client devices for adaptively streaming the video represented by the video file.

In a fifth aspect, there is provided a system include means for implementing the method of the first aspect. The system includes, among other things, means for obtaining a first segment of a video file with a first bitrate and video quality level; a controller with a trained reinforcement-learning-based adaptive streaming model for determining a second bitrate and video quality level of a second segment of the video file to be obtained after obtaining the first segment of the video file; and means for obtaining the second segment of the video file with the second determined bitrate and video quality level.

In a sixth aspect, there is provided a system include means for implementing the method of the second aspect. The system includes, among other things, a controller with a trained reinforcement-learning-based adaptive streaming model arranged to determine bitrate and video quality level of the next segment of the video file to be obtained; means for obtaining the next segment of the video file with the determined bitrate and video quality level determined for the next segment; and means for repeating the determination and obtaining steps for all subsequent segments of the video file so as to adaptively stream (play) a video represented by the video file. The system may further include means for adaptively streaming (playing) the video represented by the video file.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 11 is a diagram illustrating a training algorithm for training the reinforcement-learning-based adaptive streaming model of FIG. 10;

FIG. 13 is a table illustrating the performance of various existing methods and the method of one embodiment in a real network trace test;

FIG. 14 is a table illustrating the performance of various existing methods and the method of one embodiment in another real network trace test;

FIG. 19 is a table showing the synthetic bottleneck network trace used for the fairness analysis;

FIG. 20 is a table showing the fairness evaluation results of various existing methods and the method of one embodiment, where the quality of experience objective is (1, 2, 1, 1)

DETAILED DESCRIPTION

Figure 1:
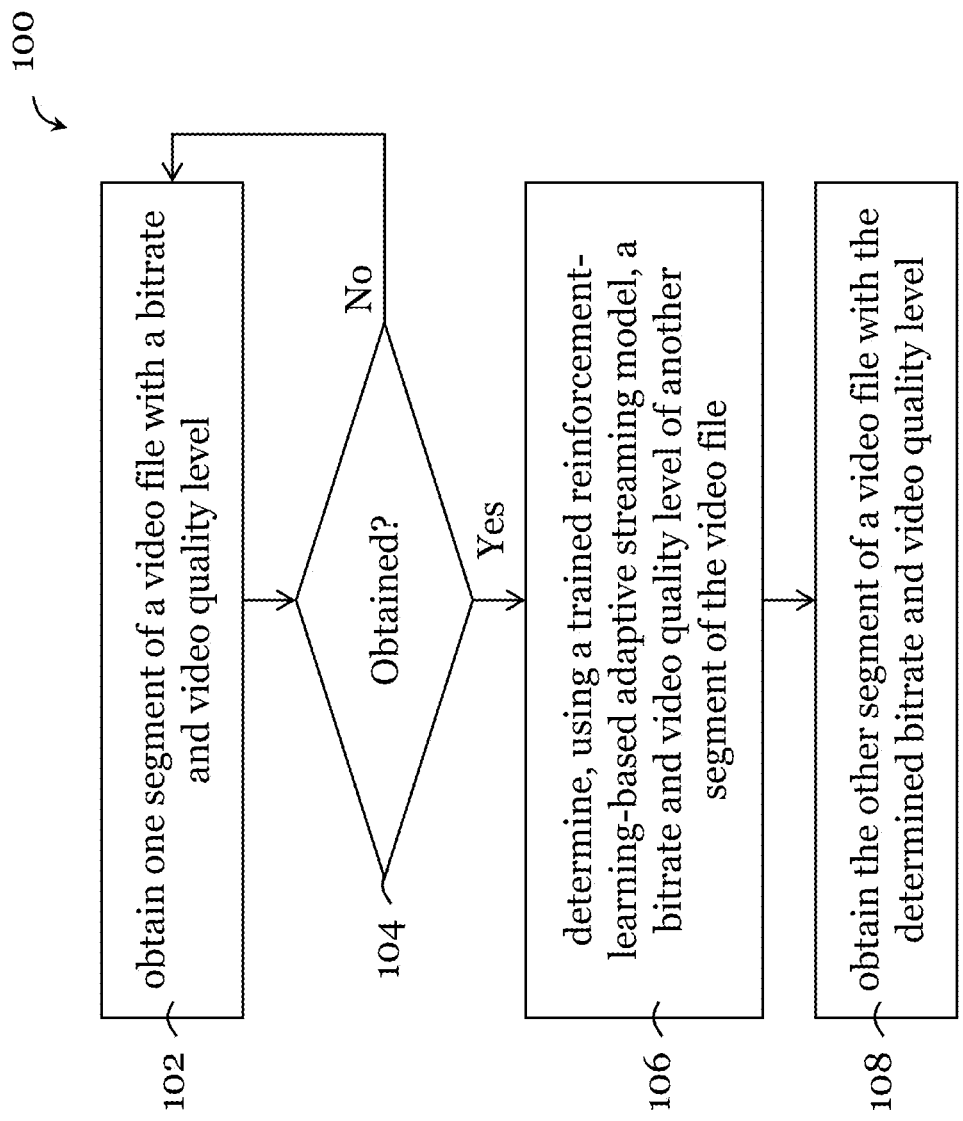
FIG. 1 is a flowchart of a method for streaming a video in one embodiment of the invention.

FIG. 1 shows a method 100 for streaming a video in one embodiment of the invention. The method 100 begins at step 102, in which a segment of a video file (representing a video) with a bitrate and video quality level is obtained. The obtaining of the segment of the video file with the specific bitrate and video quality level may be in response to a request, e.g., to a server, to obtain the segment. The request may specify the bitrate and video quality level required. The obtaining of the segment of the video file may include downloading the segment with the specific bitrate and video quality level, e.g., from the server.

Then, in step 104, a determination is made as to whether the segment of the video file is obtained. The segment may be considered as obtained when it has been fully received, or downloaded, from the server. If the segment of the video file has not been fully received, or downloaded, then the method 100 returns to step 102, to continue obtaining the segment of the video file.

If the segment of the video file has been fully received, or downloaded, then the method 100 proceeds to step 106, in which a bitrate and video quality level of another segment of the video file to be obtained is determined using a trained reinforcement-learning-based adaptive streaming model. The determination may involve detecting parameters related to segment download state and playback state associated with the video file. The trained reinforcement-learning-based adaptive streaming model may use, among other things, these detected parameters as input to determine the bitrate and video quality level that is suitable for that segment of the video file so as to facilitate streaming of the video represented by the video file. In one example, the parameters includes at least some of: video quality level of the obtained first segment; current buffer length or time; current freezing length or time; download time required and corresponding bitrate for past duration (e.g., immediate past k seconds, where k can be any number larger than 1) of the video represented by the video file; and available video quality level set and available bitrate set of the second segment.

In one example, the trained reinforcement-learning-based adaptive streaming model is trained or established using a deep deterministic policy gradient based algorithm and based at least in part on a reward function associated with a quality of experience of a viewer (or user) of the video. The reward function may take into account, at least, video quality level of a segment of the video file, video quality level variations between adjacent segments, and playback freezing events, optionally each with respective weightings. The weightings may be adjustable based on user input and/or properties of the video file so as to optimize among high instantaneous video quality level, constant video quality level, and smooth playback of the video represented by the video file.

After the determination in step 106, in step 108, that segment of the video file with determined bitrate and video quality level is obtained. The obtaining of that segment of the video file with the determined bitrate and video quality level may include transmitting a request to obtain that segment of the video file with the determined bitrate and video quality level, and receiving that segment of the video file with the determined bitrate and video quality level. The obtaining of the segment of the video file may include downloading the segment with the determined bitrate and video quality level, e.g., from the server. The segment may be considered as obtained when it has been fully received, or downloaded, from the server.

In this method 100, the two segments of the video file are consecutive and/or continuous segments of the video represented by the video file. The video quality levels of the segments may each be represented by structural similarity index or indices (e.g., an average structural similarity index of the respective segment).

In one embodiment, the method 100 further includes processing and playing the two obtained segments of the video file so as to stream the video represented by the video file. The processing and/or playing of one segment may be performed during the determination of the bitrate and video quality level of the other segment of the video file to be obtained.

In one embodiment, the method 100 further includes receiving, e.g., from a server, a media presentation description file, and subsequently, parsing the media presentation description file. The media presentation description file contains records of properties of the video file, which includes, e.g., records of available bitrates and video quality levels for each predetermined duration of a video represented by the video file (divided into segments including, at least, the two segments illustrated in method 100). The video file may be initially stored in a server and may be obtained from the server on a per-segment basis during streaming. The duration of the two segments illustrated in method 100 may be the same, and may include multiple predetermined durations. In one example, each predetermined duration is one second and each of the segments may contain two seconds of the video represented by the video file.

The adaptive streaming of the video in method 100 may be performed using dynamic adaptive streaming over HTTP (DASH), although other adaptive streaming protocols are also envisaged in other embodiments. The obtaining and determining steps 102-108 may be performed at a client device, e.g., DASH client operably connected with a server via a communication network (wired or wireless). The server may be a remote server, e.g., DASH server. The method 100 may be repeated and performed for only some or for all segments of the video file to facilitate streaming of the video represented by the video file.

Figure 2:
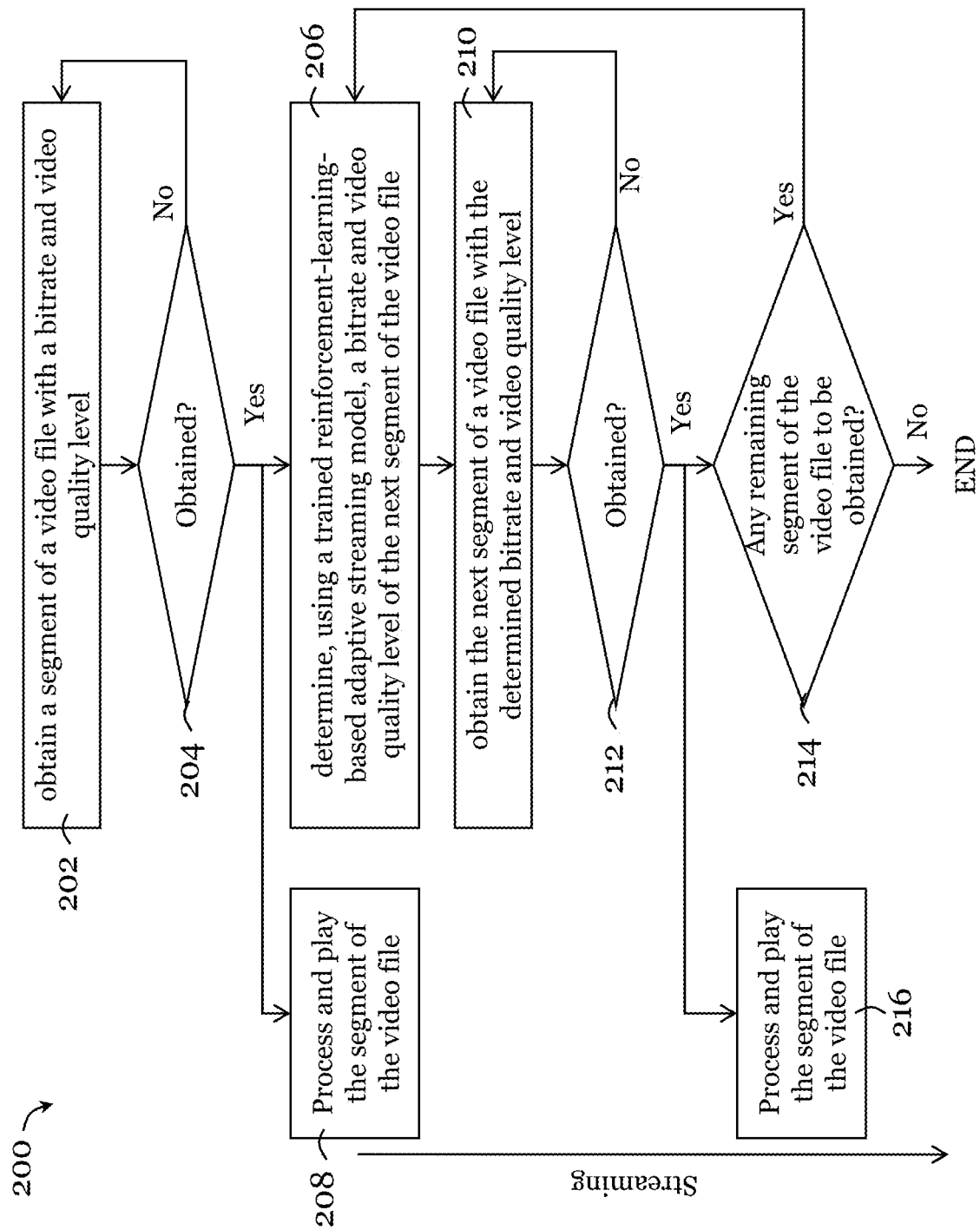
FIG. 2 is a flowchart of a method for streaming a video in one embodiment of the invention.

FIG. 2 shows a method 200 for streaming a video in one embodiment of the invention. The method 200 is similar to the method 100 illustrated with respect to FIG. 1.

The method 200 begins at step 202, in which a segment of a video file (representing a video) with a bitrate and video quality level is obtained. The obtaining of the segment of the video file with the specific bitrate and video quality level may be in response to a request, e.g., to a server, to obtain the segment. The request may specify the bitrate and video quality level required. The obtaining of the segment of the video file may include downloading the segment with the specific bitrate and video quality level, e.g., from the server.

Then, in step 204, a determination is made as to whether the segment of the video file is obtained. The segment may be considered as obtained when it has been fully received, or downloaded, from the server. If the segment of the video file has not been fully received, or downloaded, then the method 200 returns to step 202, to continue obtaining the segment of the video file.

If the segment of the video file has been fully received, or downloaded, then the method 200 proceeds to step 206, in which a bitrate and video quality level of the next segment of the video file to be obtained is determined using a trained reinforcement-learning-based adaptive streaming model, and step 208, in which the obtained segment of the video file is processed and the video segment represented by the obtained segment of the video file is played or otherwise presented to a viewer (e.g., using a video player). Steps 206 and 208 may occur simultaneously. Step 206 and 208 may begin at substantially the same time.

In step 206, the determination may involve detecting parameters related to segment download state and playback state associated with the video file. The trained reinforcement-learning-based adaptive streaming model may use, among other things, these detected parameters as input to determine the bitrate and video quality level that is suitable for that segment of the video file so as to facilitate streaming of the video represented by the video file. In one example, the parameters includes at least some of: video quality level of the obtained first segment; current buffer length or time; current freezing length or time; download time required and corresponding bitrate for past duration (e.g., immediate past k seconds, where k can be any number larger than 1) of the video represented by the video file; and available video quality level set and available bitrate set of the second segment. In one example, the trained reinforcement-learning-based adaptive streaming model is trained or established using a deep deterministic policy gradient based algorithm and based at least in part on a reward function associated with a quality of experience of a viewer (or user) of the video. The reward function may take into account, at least, video quality level of a segment of the video file, video quality level variations between adjacent segments, and playback freezing events, optionally each with respective weightings. The weightings may be adjustable based on user input and/or properties of the video file so as to optimize among high instantaneous video quality level, constant video quality level, and smooth playback of the video represented by the video file.

After the determination in step 206, in step 210, the next segment of the video file with determined bitrate and video quality level is obtained. The obtaining of the next segment of the video file with the determined bitrate and video quality level may include transmitting a request to obtain the next segment of the video file with the determined bitrate and video quality level, and receiving the next segment of the video file with the determined bitrate and video quality level. The obtaining of the next segment of the video file may include downloading the next segment with the determined bitrate and video quality level, e.g., from the server.

In step 212, a determination is made as to whether that next segment of the video file is obtained. The next segment may be considered as obtained when it has been fully received, or downloaded, from the server. If that next segment of the video file has not been fully received, or downloaded, then the method 200 returns to step 206, to continue obtaining that next segment of the video file.

If the segment of the video file has been fully received, or downloaded, then the method 200 proceeds to step 214, in which a determination is made as to whether there remains other segments of the video file to be obtained for streaming, and step 216, in which the obtained next segment of the video file is processed and the video segment represented by the obtained next segment of the video file is played or otherwise presented to a viewer (e.g., using a video player).

The video segment playing steps 208 and 216 may occur in such a way that the video can be streamed without or with minimal discontinuation perceived by the viewer.

In step 214, if it is determined that there remains video segment(s) to be obtained, then the method 200 returns to step 206 for the second next segment, and in which case steps 206 and 216 may occur simultaneously. Step 206 and 216 may begin at substantially the same time. Alternatively, in step 214, if it is determined that there remains video segment(s) to be obtained, then the method 200 ends.

In this method 200, consecutive segments (this and next segments) of the video file may be continuous segments of the video represented by the video file. The video quality levels of the segments may each be represented by structural similarity index or indices (e.g., an average structural similarity index of the respective segment).

In one embodiment, the method 200 further includes receiving, e.g., from a server, a media presentation description file, and subsequently, parsing the media presentation description file. The media presentation description file contains records of properties of the video file, which includes, e.g., records of available bitrates and video quality levels for each predetermined duration of a video represented by the video file (divided into segments including, at least, the two segments illustrated in method 200). The video file may be initially stored in a server and may be obtained from the server on a per-segment basis during streaming. The duration of the two segments illustrated in method 200 may be the same, and may include multiple predetermined durations. In one example, each predetermined duration is one second and each of the segments may contain three seconds of the video represented by the video file.

The adaptive streaming of the video in method 200 may be performed using dynamic adaptive streaming over HTTP (DASH), although other adaptive streaming protocols are also envisaged in other embodiments. The obtaining and determining steps may be performed at the client device, e.g., DASH client. The processing and playing steps may be performed at a video player integrated with the client device, or at a video player operably connected with the client device (e.g., via a communication network, wired or wireless). The method 200 may be repeated and performed for only some or for all segments of the video file to facilitate streaming of the video represented by the video file.

Figure 3A:
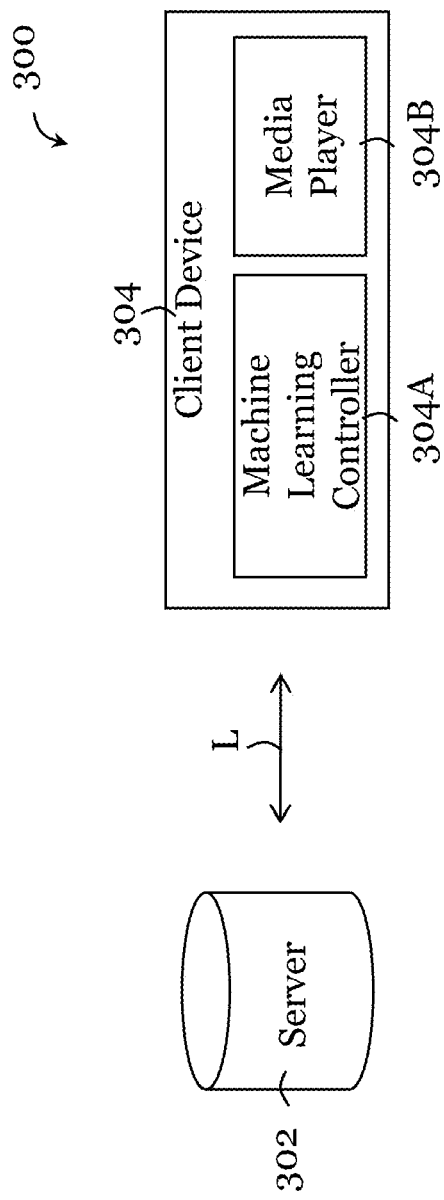
FIG. 3A is a schematic diagram of a system for streaming a video in one embodiment of the invention.
Figure 3B:
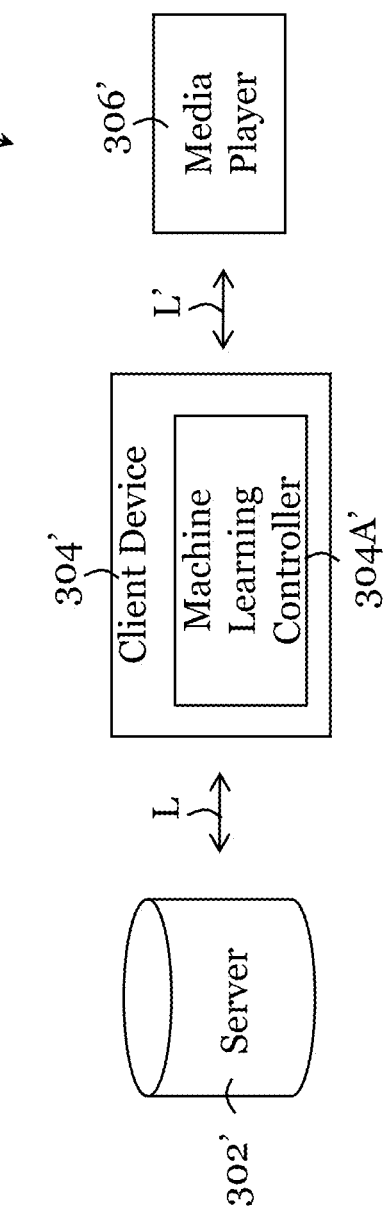
FIG. 3B is a schematic diagram of a system for streaming a video in one embodiment of the invention.

FIGS. 3A and 3B show systems for streaming a video in some embodiments of the invention. For simplicity, the Figures only include functional modules relevant to the discussion (i.e., the system may be other devices and each of the devices may include other functional modules not illustrated). The functional modules can be implemented using hardware and/or software.

The system 300 in FIG. 3A includes a server 302 operably connected with a client device 304 via a communication link L. The client device 304 includes a machine learning controller 304A arranged to process data or information using machine learning based methods, e.g., reinforcement-learning-based processing model. The client device also includes a media player operable to play a video. The communication link L may be wired or wireless. The system 300' in FIG. 3B is the same as the system 300 in FIG. 3A except that the media player 306' is arranged separately from the client device 304' and communicates with the client device 304' via a further wired or wireless communicator link L'.

In one application, the server 302, 302' may be used as the server in methods 100, 200; the client device 304, 304' may be used as the client device in methods 100, 200; the machine learning controller 304A, 304A' may be used to establish, train, and/or operate the trained reinforcement-learning-based adaptive streaming model in methods 100, 200; the media player 304B, 306' may be used as the video player in methods 100, 200.

Figures 4, 5:
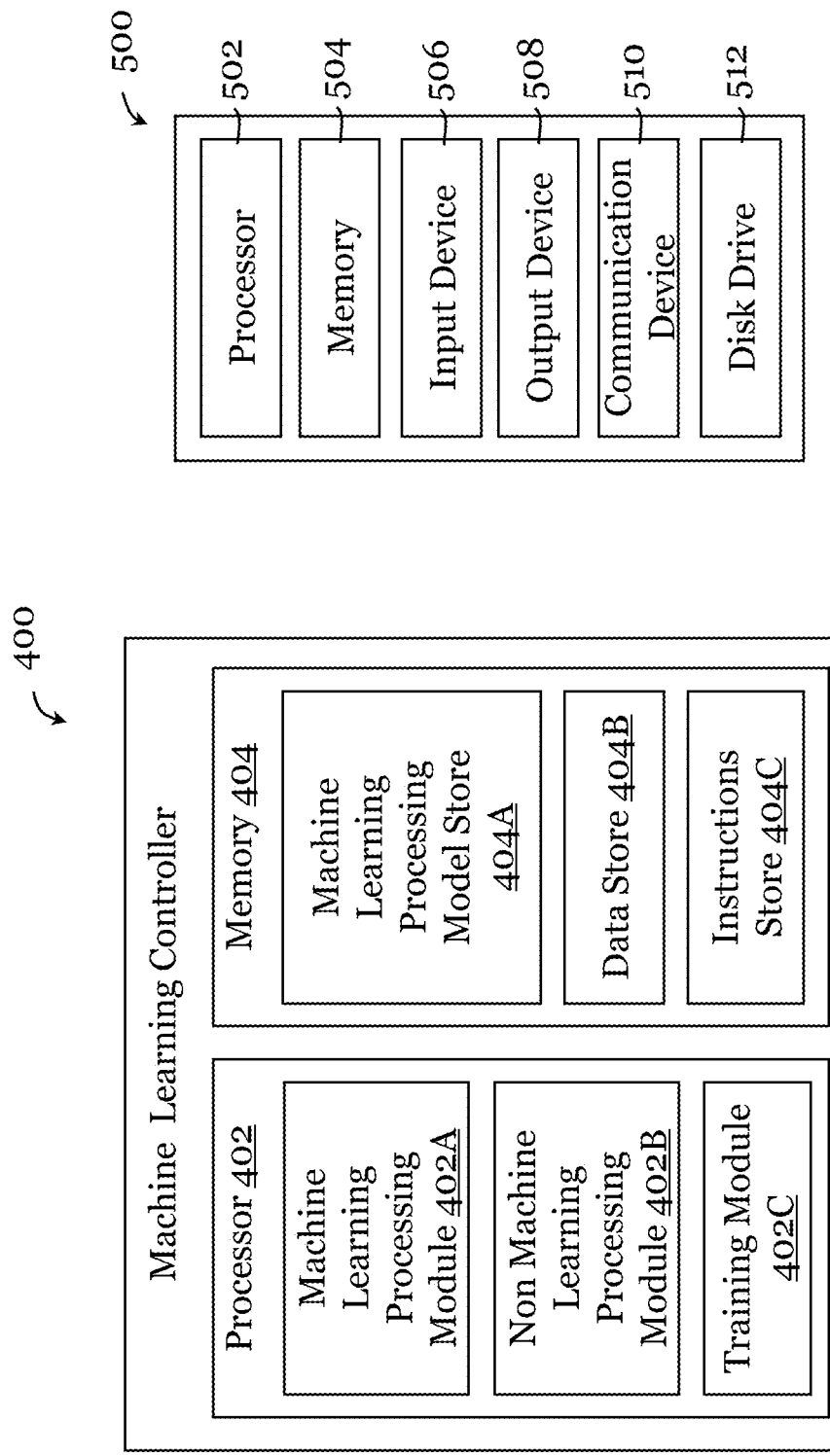
FIG. 4 is a functional block diagram of a machine learning controller in one embodiment of the invention.
FIG. 5 is a functional block diagram of an information handling system in one embodiment of the invention.

FIG. 4 shows a machine learning controller 400 in one embodiment of the invention. The machine learning controller 400 can be used, e.g., as the machine learning controller 304A, 304A' in the client device 304, 304' of the system 300, 300' of FIGS. 3A and 3B, or further systems described below, or as a machine learning controller to establish, train, and/or operate the trained reinforcement-learning-based adaptive streaming model in methods 100, 200, or further methods presented below.

The machine learning controller 400 includes a processor 402 and a memory 404. The processor 402 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process information and/or data. The memory 404 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations.

The processor 402 includes a machine learning processing module 402A and a non machine learning processing module 402B. The machine learning processing module 402A is arranged to process data using one or more machine learning processing models. In this embodiment, the machine learning processing model may determine a bitrate and video quality level of another (e.g., the next) segment of the video file after one (e.g., the previous) segment of the video file has been obtained using a trained reinforcement-learning-based adaptive streaming model. The non machine learning processing module 402B is arranged to process data without using machine learning processing models or methods. For example, the non machine learning processing module 402B may be used to perform various video signal or data processing such as filtering, segmenting, thresholding, averaging, smoothing, padding, transforming, scaling, etc. The non machine learning processing module 402B may process a video file or segment to determine its properties. The processor 402 also may include a training module 402C arranged to train the machine learning processing model(s) used to determine the bitrate and video quality level for the other video segment to be obtained, such as the model(s) in the memory 404.

The memory 404 includes a machine learning processing model store 404A arranged to store one or more machine learning processing models to be used by the processor 402 for processing data. The one or more machine learning processing models may be used to determine a bitrate and video quality level of another (e.g., the next) segment of the video file after one (e.g., the previous) segment of the video file. In one example, only one machine learning processing model is stored. In another example, multiple machine learning processing models are stored. The machine learning processing model(s) in the machine learning processing model store 404A may be trained, re-trained, or updated as needed—new or modified machine learning processing model(s) may be obtained by training or by data transfer (loading the new model into the machine learning controller 400). The memory 404 also includes data store 404B and instructions store 404C. The data store 404B may store: training/validation/test data for training/validating/testing the machine learning processing model(s), data received from external devices such as server. The instructions store 404C stores instructions, commands, codes, etc., that can be used by the processor 402 to operate the machine learning controller 400. The machine learning controller 400, with the training module 402C, can initialize, construct, train, and/or operate the one or more machine learning processing models (e.g., algorithms) in machine learning processing model store 404A. In one embodiment, the machine learning processing model includes a reinforcement-learning-based processing model (e.g., reinforcement-learning-based adaptive streaming model).

FIG. 5 shows an information handling system 500 that can be used as a server (such as server 302, 302'), a client device (such as client device 304, 304'), a computing device that includes media player 304B, 306', or another type of information processing device or system in one embodiment of the invention. The machine learning controller 400 may be integrated with the system 500. The information handling system 500 can be portable, wearable, etc. The information handling system 500 generally comprises suitable hardware and/or software components necessary to receive, store, and execute appropriate computer instructions, commands, or codes. The main components of the information handling system 500 are a processor 502 and a memory (storage) 504. The processor 502 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 504 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 504. Optionally, the information handling system 500 further includes one or more input devices 506. Examples of such input device 506 include one or more of: keyboard, mouse, stylus, image scanner (e.g., identifier (barcode, QR code, etc.) scanner), microphone, tactile/touch input device (e.g., touch sensitive screen), image/video input device (e.g., camera), biometric data input device (e.g., fingerprint detector, facial detector, etc.), etc. Optionally, the information handling system 500 further includes one or more output devices 508. Examples of such output device 508 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The information handling system 500 may further include one or more disk drives 512 which may encompass one or more of: solid state drive, hard disk drive, optical drive, flash drive, magnetic tape drive, etc. A suitable operating system may be installed in the information handling system 500, e.g., on the disk drive 512 or in the memory 504. The memory 504 and the disk drive 512 may be operated by the processor 502. Optionally, the information handling system 500 also includes a communication device 510 for establishing one or more communication links with one or more other computing devices such as servers, personal computers, terminals, tablets, phones, watches, IoT devices, or other wireless or handheld computing devices. The communication device 510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 502, the memory 504, and optionally the input device(s) 506, the output device(s) 508, the communication device 510 and the disk drives 512 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 500 shown in FIG. 5 is merely exemplary and that the information handling system 500 can in other embodiments have different configurations (e.g., additional components, fewer components, distributed, etc.).

Figure 6:
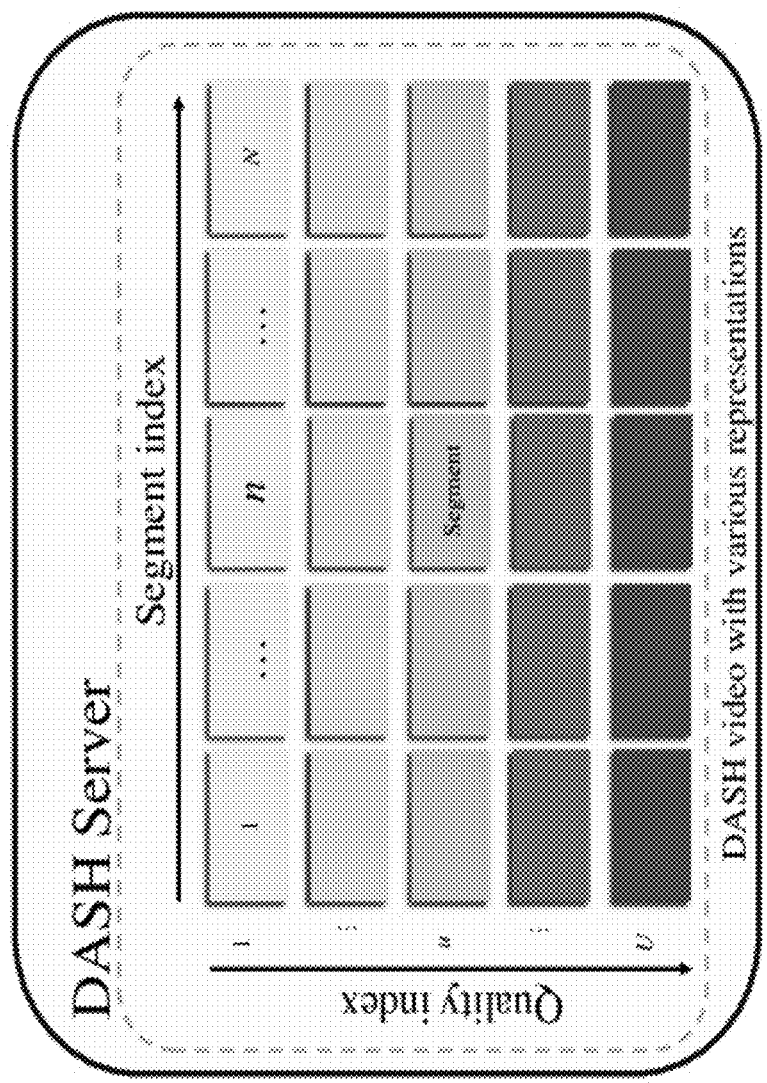
FIG. 6 is a schematic diagram of a DASH server illustrating its video storage structure.
Figure 7:
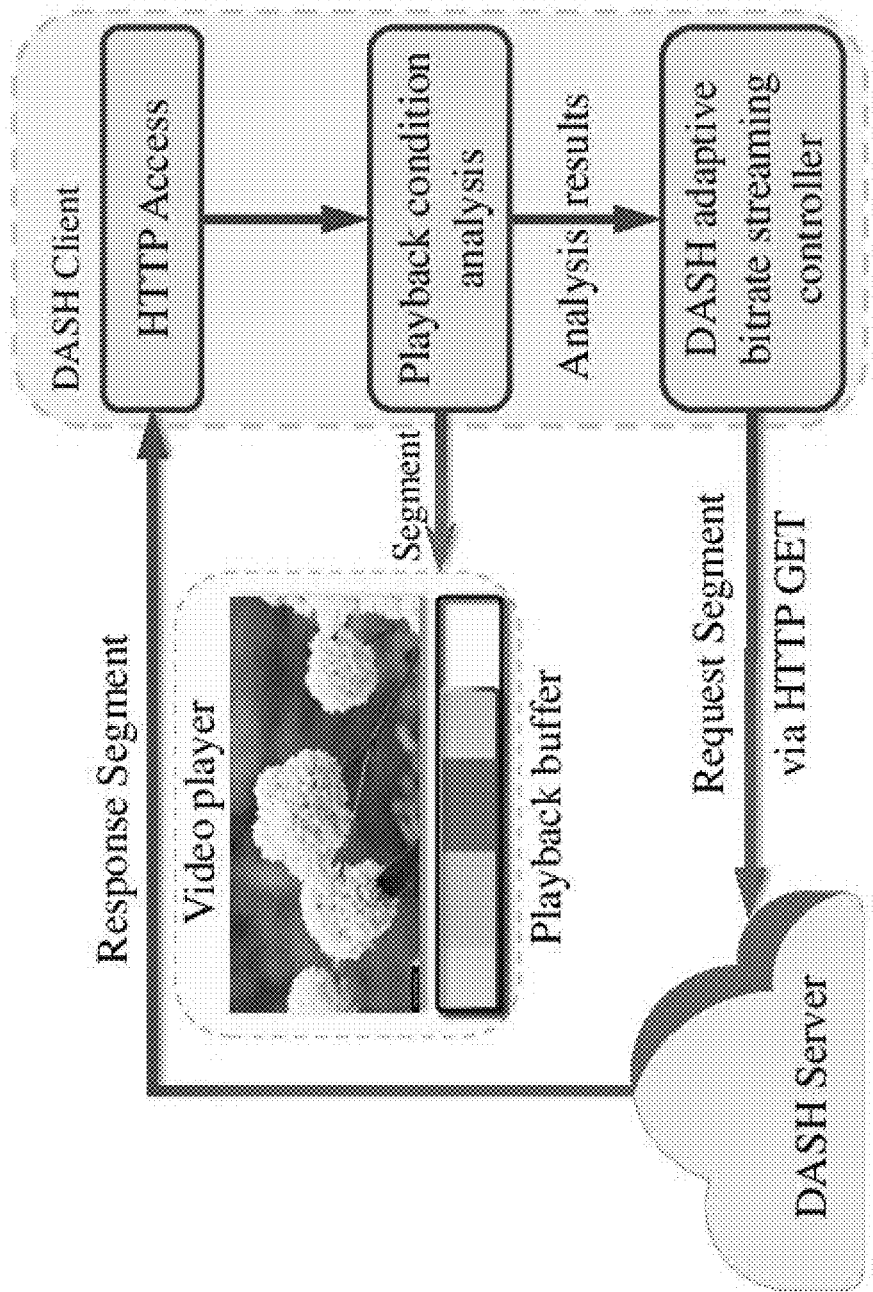
FIG. 7 is a schematic diagram illustrating operation of a DASH system.

FIGS. 6 and 7 illustrate a DASH system and its operation (FIG. 7), and a DASH server in the DASH system (FIG. 6). As shown in FIG. 6, the DASH system/server first encodes video content in different representations (e.g., with varying bitrates, resolutions, qualities, etc.). Each representation is then divided into several segments (or chunks) with a fixed playback duration. The corresponding representation description is recorded in an XML-like file called a media presentation description (MPD) file. The encoded videos and the media presentation description file are stored on a hypertext transfer protocol (HTTP) web server. In operation, as shown in FIG. 7, users can request DASH video contents via HTTP. The DASH client first receives and parses the media presentation description file and then requests the desired segments in an appropriate representation version for playback with the help of the adaptive bitrate controller according to, e.g., the network conditions and the playback state. To guarantee user quality of experience under fluctuating network conditions between the DASH client and the DASH server, an adaptive bitrate selection algorithm is applied for the DASH system. With the adaptive bitrate algorithm, the DASH client can request successive video segments at an appropriate bitrate based on the network conditions (bandwidth) and the playback state (buffer length, playback freezing, and video quality) to avoid quality of experience losses.

The inventors have devised, through research, experiments, and trials, that DASH has become a popular adaptive bitrate streaming technique because, e.g., (1) the DASH system is built on top of HTTP so the video packets have little difficulties passing through firewalls or network address translation (NAT) devices, (2) the DASH adaptive bitrate decision is mainly client driven hence all the adaptive bitrate logic resides on the client side and playback does not require a persistent connection between the server and the client, (3) the server is not required to maintain session state information for each client, which increases scalability, (4) because the DASH system transmits videos over HTTP, it is easy and seamless to deploy and adapt to all existing HTTP facilities, including HTTP caches, servers, and scalable content delivery networks (CDNs).

The inventors have realized that designing efficient adaptive bitrate algorithms is a challenge for the DASH system. Generally, existing DASH adaptive bitrate algorithms can be grouped into two classes: model-based (e.g., buffer-based model, throughput-based model, hybrid model) and learning-based algorithms. Model-based algorithms generally focus on pre-building a quality of experience model and controlling the adaptive bitrate decision based on the pre-built model, whereas learning-based methods generally attempt to capitalize on experiences to reach a decision using learning methods. The inventors have realized, through research, experiments, and trials, that learning-based algorithms may be more suitable in some applications, and that reinforcement-learning-based algorithms, which can learn to make decisions from experience, and have relatively low computational complexity, may be suitable for DASH systems.

To this end, the inventors have devised a reinforcement learning based DASH framework targeted toward improving user quality of experience. With the reinforcement learning algorithm of one embodiment, the optimized adaptive bitrate algorithm can be learned directly from experience without the need to pre-set fixed heuristics or inaccurate system models. The framework in the embodiment includes both a more stable DASH video encoding method and a reinforcement learning based adaptive bitrate algorithm that addresses one or more deficiencies in some existing systems. As will be presented in further detail below, in one embodiment, the DASH adaptive bitrate selection problem is formulated as a Markov decision process (Markov decision process) problem, and a reinforcement learning based adaptive bitrate method is used to solve the Markov decision process problem. In the embodiment, the DASH client acts as the reinforcement learning agent, and the network variation acts as the environment. Video quality and bitrate, client buffer status, and playback freezing issues are adopted as reinforcement learning input, while the proposed user quality of experience, which jointly considers the video quality and buffer status, is used as the reward. The reinforcement learning based adaptive bitrate algorithm may then be embedded or otherwise included in the DASH framework.

Figure 8:
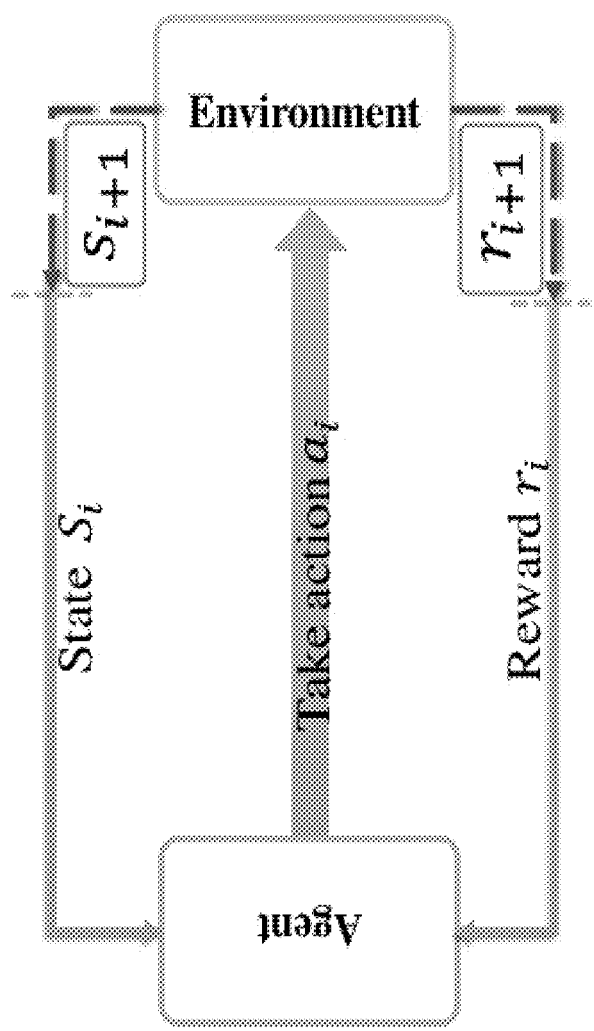
FIG. 8 is a schematic diagram illustrating a reinforcement-learning model.

FIG. 8 shows a reinforcement learning framework in which the agent is in an interactive environment. The goal of reinforcement learning is to learn a suitable policy for the agent through trial and error by using feedback from its actions as experiences. After finding the optimal policy, the agent can dynamically adapt to varying environmental conditions to maximize future rewards.

The inventors have realized, through research, experiments, and trials, that adaptive bitrate algorithms are designed to provide high quality of experience for DASH users and that DASH users' quality of experience metrics can span across the temporal and perceptual aspects. The temporal aspect includes time-related events such as the playback buffer level, playback freezing frequency, and freezing duration. The perceptual aspect captures the received video segment quality and the extent to which the quality switches between adjacent segments. The inventors have realized that to achieve high quality of experience, a well-designed adaptive bitrate strategy should maximize the received visual quality while minimizing the temporal quality degradation. As such, the inventors have, in some embodiments, applied structural similarity index (SSIM) as the perceptual quality metric when designing the quality of experience metric for the DASH system, and have considered both temporal and perceptual quality of experience metrics.

Figure 9:
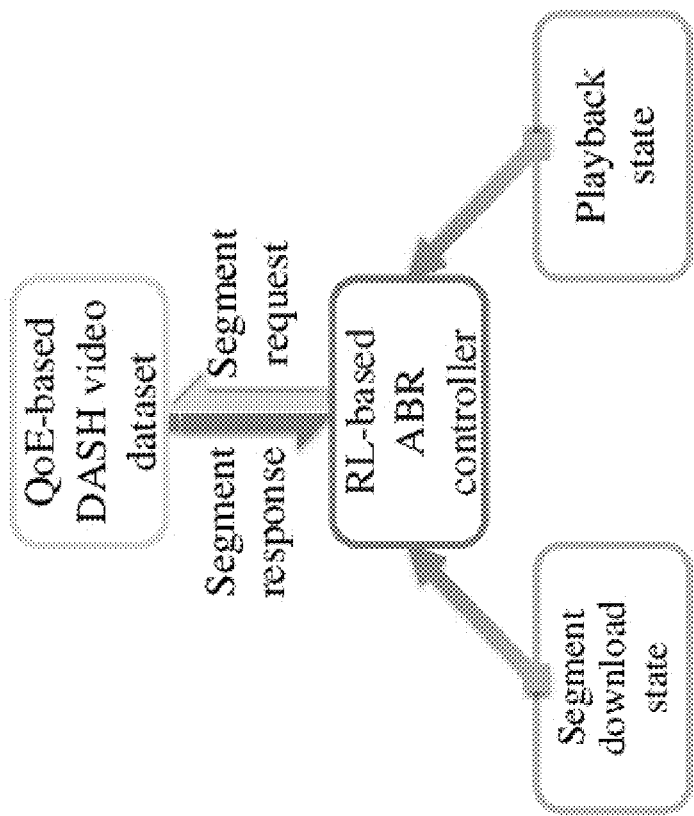
FIG. 9 is a schematic diagram illustrating a DASH framework in one embodiment of the invention.

FIG. 9 shows a quality-of-experience-oriented DASH framework in one embodiment of the invention. In one embodiment, the DASH video dataset is generated with the SSIM-based rate control (RC) scheme. The reinforcement learning based adaptive bitrate controller takes the adaptive bitrate decision (e.g., transmit segment request and receive corresponding segment response) to guarantee a high user quality of experience according to the observed "segment download state" and the "playback state" of the system.

The framework in FIG. 9 generally includes two parts: the DASH video segment encoding method and the reinforcement learning based adaptive bitrate algorithm. In this embodiment, the DASH video dataset is generated based on the SSIM-based rate control (RC) method disclosed in M. Zhou, X. Wei, S. Wang, S. Kwong, C. Fong, P. Wong, W. Yuen, and W. Gao. *SSIM-based global optimization for ctu-level rate control in hevc, IEEE Transactions on Multimedia*, pages 1-1, 2019, which is implemented on an x265 platform. The effective SSIM-based rate control (RC) method encodes video segments with stable SSIMs and steady bitrates. In one embodiment, such video segment encoding method improves the user quality of experience and reduces the storage space required on the server side.

Because reinforcement learning methods can interact with various environments flexibly and learn the adaptive bitrate algorithm directly from experience without the need to predefine fixed models, the inventors have chosen, in one embodiment, reinforcement learning methods to model the DASH adaptive bitrate decision. As a bitrate increase may not correspond to an improvement in video quality, the reinforcement learning based DASH adaptive bitrate algorithm in one embodiment aims to select suitable video segment quality levels by jointly considering the bitrate, video quality, and playback status. In one implementation, to address the inherent variability of video content, the video bitrate and quality are recorded each second in the media presentation description file instead of recording only the average segment bitrate.

In one embodiment of the DASH framework, the video dataset U is indicated by $U=\{U_i\}$, $U_i=\{rate_{i,j}, vq_{i,j}\}$. $U_i$ is the video representation set of segment i, where $rate_{i,j}$ is the jth bit-rate level of video segment i, $vq_{i,j}$ is the corresponding video quality level, i is the video segment index, and j is the video bitrate/quality index. The DASH client downloads the video sequence segments individually from the server. The adaptive bitrate decision is made after one segment has been fully downloaded to choose a suitable video representation $\{rate_{i+1}, vq_{i+1}\}$ for the next segment from the available set $U_{i+1}$.

For each segment i, the download time rc is calculated as follows:

$$\tau_i = rate_i T/C_i, \qquad (1)$$

where $rate_i$ is the average bitrate of segment i (selected from $\{rate_{i,j}|j=1, 2, \ldots, M\}$), T is the playback duration of segment i, and $C_i$ is the average network capacity during the download of segment i.

Let $B_i$ be the buffer length when starting to download segment i. When $\tau_i$ is less than or equal to $B_i$, the DASH user will have a smooth playback experience; when $\tau_i$ is greater than $B_i$, playback freezing will occur, thus influencing the user quality of experience. The buffer length that causes playback freezing is $$F_i = \max\{0, \tau_i - B_i\}. \quad (2)$$

When $\tau_i > B_i$, the playback buffer will become empty before the next segment is completely downloaded. As segment i+1 is fully downloaded, the buffer length of the next segment will be T. When $T < \tau_i < B_i$, the buffer length of the next segment will decrease. When $\tau_i < T < B_i$, the buffer length of the next segment will increase. Thus, the buffer length variation can be described as follows:

$$B_{i+1} = \begin{cases} T, & \text{if } \tau_i \geq B_i, \\ B_i - \tau_i + T & \text{if } \tau_i < B_i. \end{cases} \quad (3)$$

In one implementation, the quality of experience of the DASH user may depend on several factors: the visual quality of the received segment, the quality variations between segments, and playback freezing events. To derive a reinforcement learning policy that maximizes the user quality of experience, the quality of experience factors mentioned above and a quality of experience reward function is proposed for use in a reinforcement learning based adaptive bitrate decision in one embodiment.

In one embodiment, SSIM is applied as the instantaneous quality metric of a video sequence. Then, $vq_i$ is the average SSIM of segment i (selected from $\{vq_{i,j}|j=1, 2, \ldots, M\}$).

A freezing risk penalty $FRP_i$ is introduced to avoid too-short buffer lengths:

$$FRP_i = \max(0, Bth_{i-1} - B_i), \quad (4)$$

where $Bth_i$ represents the risk of playback freezing. $Bth_i$ is a function of $F_i$ and can be calculated using the following updating function:

$$Bth_i = \omega_{FRP} F_i + (1 - \omega_{FRP}) Bth_{i-1}, \quad (5)$$

where $\omega_{FRP}$ is a coefficient where $0 < \omega_{FRP} < 1$. When $\omega_{FRP}$ is small, the previously amended $Bth_{i-1}$ may play a more important role in the risk of playback freezing. As $\omega_{FRP}$ increases, $Bth_i$ will become close to the current measured value $F_i$. The value of $\omega_{FRP}$ is as follows:

$$\omega_{FRP} = \frac{\exp(\mu - 0.5)}{1 + \exp(\mu - 0.5)}, \quad (6)$$

where $\mu$ is the normalised difference between $F_i$ and $Bth_{i-1}$:

$$\mu = \frac{|F_i - Bth_{i-1}|}{F_i}. \quad (7)$$

Finally, the DASH quality of experience function is defined below, $$QoE_i = \alpha_{qoe} vq_i - \beta_{qoe} |vq_i - vq_{i-1}| - \gamma_{qoe} F_i - \delta_{qoe} FRP_i, \quad (8)$$

in which the weights $\alpha_{qoe}$, $\beta_{qoe}$, $\gamma_{qoe}$ and $\delta_{qoe}$ are used to normalise the different quality of experience metrics. Thus, they also represent a trade-off between a high instantaneous quality, a constant quality level, and smooth playback. The desired operational point might depend on several factors, including user preferences and video content. In one example, the parameter tuning strategy may follow that described in M. Gadaleta, F. Chiariotti, M. Rossi, and A. Zanella. *D-dash: A deep q-learning framework for dash video streaming, IEEE Transactions on Cognitive Communications and Networking,* 3(4):703-718, December 2017.

Because video content consists of a sequence of scenes with exponentially distributed duration, the DASH adaptive bitrate algorithm can be modeled as an Markov decision process problem. This Markov decision process problem consists of five main elements $\mathcal{M} = \langle \mathcal{S}, \mathcal{A}, P, r, \gamma \rangle$, where the symbols are well aligned with reinforcement learning problem settings: $\mathcal{S}$ is a set of states, named the state space; $\mathcal{A}$ is a set of actions, named the action space; P is the transition probability function; r is the reward function; and $\gamma \in (0, 1]$ is the discount factor for future reward.

First, the five elements need to be mapped into the DASH system to formulate the DASH adaptive bitrate process into a Markov decision process.

The action space $\mathcal{A}$ is the available video dataset U. When segment i is completely downloaded (e.g., at time step i), the DASH agent attempts to determine the bitrate and video quality level $U_{i+1} = (rate_{i+1}, vq_{i+1})$ for the next segment to be downloaded. The agent receives a state $s_i$ and selects an action $a_i$ from the action space $\mathcal{A}$ according to its policy $\pi$, where $\pi$ is a function that maps states to actions. The state space $\mathcal{S}$ should contain sufficient information to provide a precise evaluation of the reward function for each possible action $a_i \in \mathcal{A}$.

Considering the quality of experience function defined in Equation (8) as a natural option for the utility function of the Markov decision process, at time step i, the states of the DASH adaptive bitrate problem includes the video quality $vq_i$ of the ith downloaded segment, the current buffer length $B_i$, the download time $\vec{\tau_i} = (\tau_{i-K}, \ldots, \tau_i)$ required for the previous K seconds of the video, the video's corresponding bitrate $\overrightarrow{rate_i} = (rate_{i-K}, \ldots, rate_i)$, the freezing time $F_i$, and the available video quality set $\{vq_{i+1}\}$ and the bitrate set $\{rate_{i+1}\}$ of the (i+1)th segment.

As mentioned above, in this embodiment, the state of the Markov decision process at the time step i can be described by a 7-tuple $s_i = (vq_i, B_i, \vec{\tau_i}, \overrightarrow{rate_i}, F_i, \{vq_{i+1}\}, \{rate_{i+1}\})$. The DASH adaptive bitrate Markov decision process elements are as follows:

Input State: After downloading each segment i, the DASH agent receives the player's state $s_i = (vq_i, B_i, \vec{\tau_i}, \overrightarrow{rate_i}, F_i, vq_{i+1}, rate_{i+1})$ as its input.

Output Action: When segment i is completely downloaded (e.g., at time step i), the output action $a_i = (a_i^{bit}, a_i^q)$ of the DASH learning agent determines the bitrate and video quality level $U_{i+1} = (rate_{i+1}, vq_{i+1})$ of the next segment to be downloaded, $a_i^{bit}, a_i^q \in [-1, 1]$ which corresponds to the bitrate and quality of the video segment. Considering the bitrate limits and quality discretization, to make more precise adaptive bitrate decisions, we also establish a linear mapping between action and the available bitrate and video quality level set $\{U_{i+1}\}$ to improve the accuracy of the decision.

Reward: When given a state and an action, the DASH Markov decision process reward function $r_i$ can be defined as follows:

$$r_i(s_i, a_i) = QoE_i. \qquad (9)$$

Given the reward function $r_i$, the long-term return achieved with the discounting factor $\gamma \in (0,1]$ when starting from state $s_i$ can be defined as $$R_i = \sum_{h=0}^{\infty} \gamma^h r_{i+h}. \qquad (10)$$

The goal of the agent is to maximize the expected return from each state $s_i$. The action value $Q^\pi(s, a)$ is the expected return for selecting action a in state s following policy $\pi$:

$$Q^\pi(s,a) = E[R_i | s_i = s, a]. \qquad (11)$$

To obtain the maximum return, the Markov decision process solution should find the optimal policy $\pi^*(.)$ defined as follows:

$$\pi^*(.) = \mathrm{argmax}_\pi Q^\pi(s,a), \forall s \in \mathcal{S}. \qquad (12)$$

To solve the above optimization problem, one possible approach is to adopt reinforcement learning tools such as the actor-critic algorithm, which can guarantee a faster convergence to the optimal solution. One example of actor-critic algorithm can be found in J. Peters and S. Schaal. *Natural actor-critic, Neurocomputing*, 71(7):1180-1190, 2008. *Progress in Modeling, Theory, and Application of Computational Intelligence*.

In this embodiment, the Deep Deterministic Policy Gradient (DDPG) is used to establish the reinforcement learning based adaptive bitrate decision algorithm. The DDPG is an efficient solution in continuous control tasks.

Figure 10:
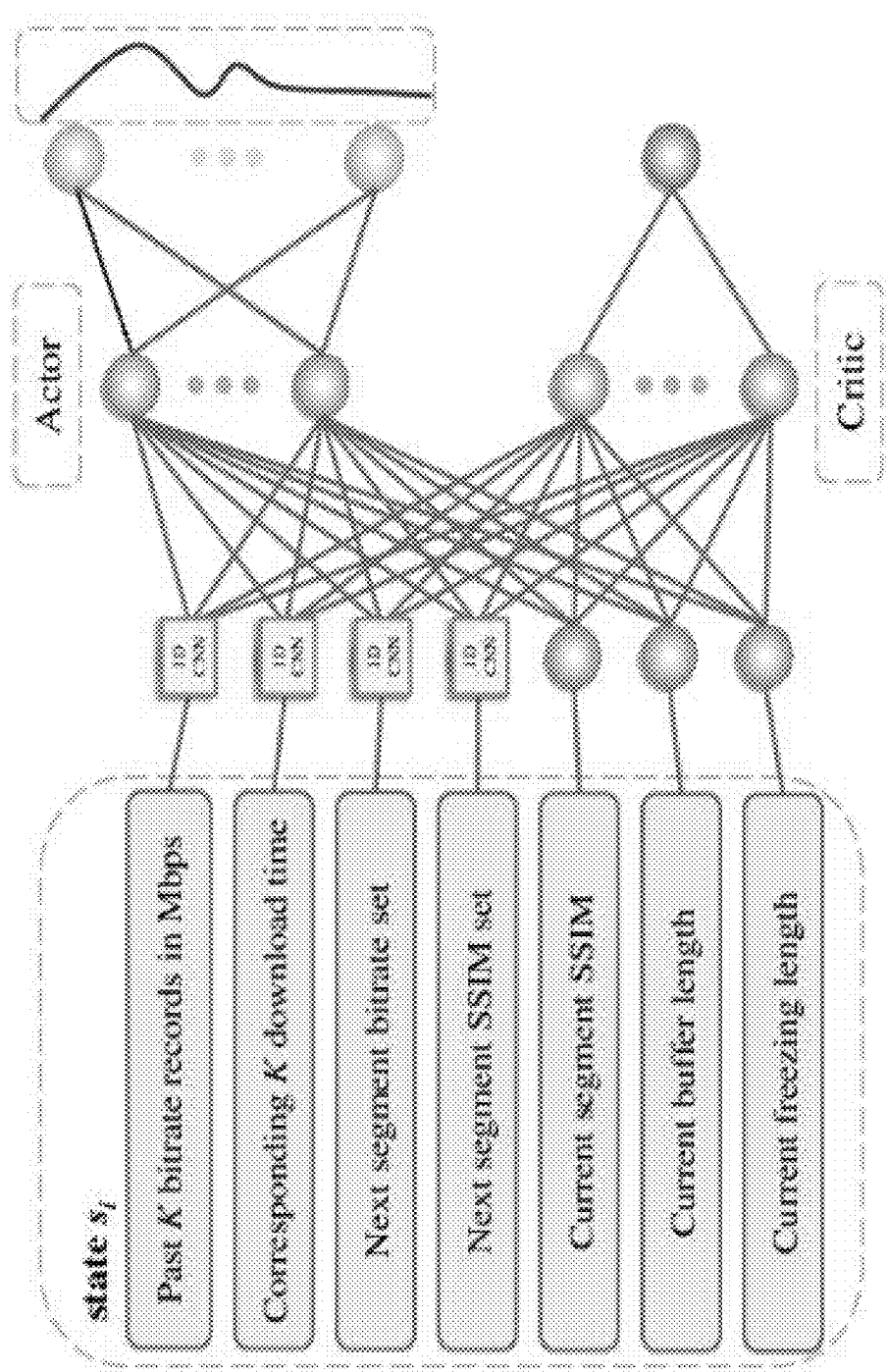
FIG. 10 is a schematic diagram illustrating a reinforcement-learning-based adaptive streaming model in one embodiment of the invention.

FIG. 10 shows the DDPG framework for reinforcement learning based DASH adaptive bitrate decision making in one embodiment. Unlike other reinforcement learning based methods, the reinforcement learning based adaptive bitrate framework in this embodiment does not directly use a predicted network throughput as an input, and its action determines the video quality (bitrate and video quality level) for the next segment. A mapping method between states and actions is established to improve the accuracy of the adaptive bitrate decisions. Freezing status is considered in the decision making to avoid playback interruptions.

The actor-critic method is a hybrid reinforcement learning method for solving Markov decision process that includes two components: 1) an actor that controls how the agent behaves and 2) a critic that measures the quality of the action taken. When the training process begins, the agent performs actions randomly. The critic observes the results of these actions and provides feedback with a value function $\hat{q}(s, a, \omega)$. Learning from the feedback, the agent will update the actor policy $\pi(s, a, \theta)$. At each time step i, the agent will receive a state $s_i$ from the environment as the input. The actor then selects an action $a_i$ and subsequently receives a new state $s_{i+1}$ with a reward $r_i$. The critic computes the value of action $a_i$, and the actor updates $\theta$ using $\hat{q}(s, a, \omega)$:

$$\Delta\theta = \alpha_{actor} \nabla_\theta (\log \pi_\theta(s,a)) \hat{q}(s,a,\omega), \qquad (13)$$

where $\alpha_{actor}$ is the learning rate of the actor.

After updating the weight $\theta$, the actor performs the next action at $a_{i+1}$, and the environment returns a new state $s_{i+1}$.

The critic then updates its value weights $\omega$ according to the following function:

$$\Delta\omega = \alpha_{critic}(R_i + \gamma \hat{q}_\omega(s_{i+1}, a_{i+1}) - \hat{q}_\omega(s_i, a_i)) \nabla_\omega \hat{q}(s_i, a_i, \omega), \qquad (14)$$

where $\alpha_{critic}$ is the learning rate of the critic.

As the training time increases, the actor will converge to the optimal policy $\pi^*$. When segment i has been fully downloaded, the DASH learning agent receives the state $s_i$ and performs an action to determine a suitable bitrate and quality for the (i+1)th video segment. The action is selected by following the policy. The goal of the agent is to find a suitable action $a_i$ for state $s_i$ that can maximise the accumulated reward $r_i$. As a result, $\pi(.)$ should be optimised to achieve this goal. This embodiment uses the policy gradient method to update the policy parameter $\theta$ and generate the best policy $\pi^*(.)$:

$$\theta \leftarrow \theta + \alpha_{actor} \nabla_\theta (\log \pi_\theta(s_i, a_i)) A(s_i, a, \omega), \qquad (15)$$

where $\alpha_{actor}$ is the learning rate of the actor and $\theta$ is updated using the advantage function $A(s_i, a_i)$ instead of the value function $\hat{q}(s, a, \omega)$ in Equation (13) to ensure learning stability, $$A(s_i, a_i) = Q(s_i, a_i) - V(s_i), \qquad (16)$$

where $Q(s_i, a)$ is the q value of taking action $a_i$ in state $s_i$ and $V(s)$ is the average value of state $s_i$. The drawback of implementing $A(s_i, a_i)$ is that two value functions $Q(s, a)$ and $V(s)$ are needed. To further improve the efficiency, the temporal difference (TD) error is used to estimate the advantage function:

$$A(s_i, a_i) = r_i + \gamma V(s_{i+1} | \theta_{i+1}) - V(s_i). \qquad (17)$$

In one embodiment, the entropy of the policy network is added to Equation (15) to avoid converging to sub-optimal policies. In addition, the $\theta$ update function is rewritten as follows:

$$\theta \leftarrow \theta + \alpha_{actor} \nabla_\theta (\log \pi_\theta(s_i, a_i)) A(s_i, a, \omega) + \beta \nabla_\theta H(\pi_\theta(.|s_i)), \qquad (18)$$

where $\beta$ is a hyper-parameter and $H(.)$ is the entropy of the policy.

In FIG. 10, the critic helps train the actor: only the actor is used in the testing phase. The training strategy, i.e., the training algorithm for training the reinforcement-learning-based adaptive streaming model of FIG. 10, is summarized in the Algorithm of FIG. 11. In the training, all the network traces in the training dataset TD are repeatedly simulated, and the rewards will be calculated and recorded. The parameters are trained based on the updating rules (lines 8-10 of the algorithm in FIG. 11) to obtain the trained adaptive bitrate model.

Compared with other reinforcement learning based algorithms such as "Pensieve" illustrated in M. Hongzi, N. Ravi, and A. Mohammad. *Neural adaptive video streaming with pensieve. In Proceedings of the Conference of the ACM Special Interest Group on Data Communication, SIGCOMM '17*, pages 197-210, New York, N.Y., USA, 2017. ACM., the approach in the above embodiments are different.

First, in the embodiments, video quality (measured in SSIM) rather than bitrate is used for reinforcement learning based adaptive bitrate optimization.

Second, the "Pensieve" uses a simple fixed rule to predict network throughput, whereas the algorithm of the above embodiments directly utilizes the observed segment download time and segment size to obtain the optimal solution. Furthermore, to address the inherent variability of video content, in some embodiments, the video bitrate and quality are recorded for each second in the media presentation description file (instead of only the average segment bitrate). Also, to consider bitrate limits and quality discretization and make more precise adaptive bitrate decisions, the embodiments use DDPG to establish the reinforcement learning based adaptive bitrate decision-making algorithm for continuous adaptive bitrate control. As presented below, the proposed algorithm in the above embodiment outperforms some existing methods in terms of the proposed quality of experience model with different quality of experience parameter sets.

Figure 12:
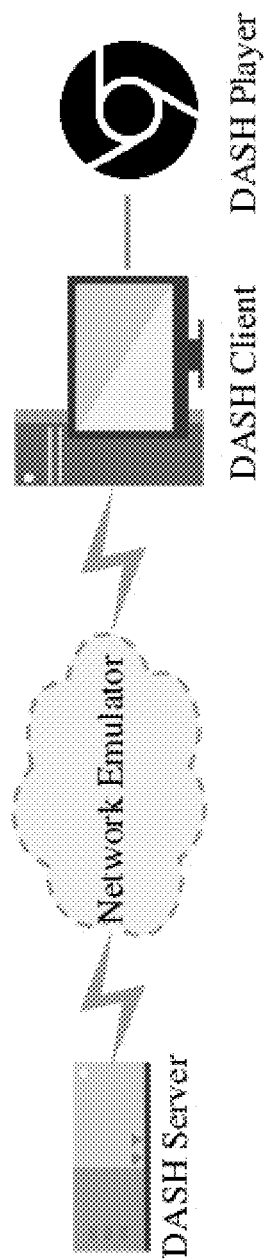
FIG. 12 is a schematic diagram of a system for evaluation the performance of the reinforcement-learning-based adaptive streaming model of FIG. 10.

The effectiveness of the algorithm in the above embodiment has been verified through tests/experiments on an experimental platform based on the guidelines provided by the DASH industry forum (DASH-IF) illustrated in *DASH-IF, Dash industry forum: Catalyzing the adoption of mpeg-dash*, 2019 and as shown in FIG. 12. In FIG. 12, the client server is connected through a network emulator that can simulate network conditions with network traces. Apache 2.4.1 acts as the DASH server and stores the original and proposed video datasets. On the client side, dash.js illustrated in *DASH-IF: dash.js. A reference client implementation for the playback of mpeg dash via javascript and compliant browsers*, 2019 is adopted and modified to support each of the aforementioned state-of-the-art adaptive bitrate algorithms and DASH video playback.

Four existing adaptive bitrate algorithms are chosen for comparison with the proposed embodiment of the reinforcement learning based DASH adaptive bitrate algorithm. These existing algorithms include both model-based and learning-based adaptive bitrate algorithms:

Buffer-Based (BB): BB selects the video bitrate using a buffer control model to maintain a buffer length between 5 and 15 seconds. Illustrated in H. Te-Yuan, J. Ramesh, M. Nick, T. Matthew, and W. Mark. *A buffer-based approach to rate adaptation: Evidence from a large video streaming service*. In Proceedings of the 2014 ACM Conference on SIGCOMM, SIGCOMM '14, pages 187-198, New York, N.Y., USA, 2014. ACM.

Rate-Based (RB): RB uses a network throughput prediction model to select the highest available bitrate under the bandwidth constraint. Illustrated in Y. Sun, X. Yin, J. Jiang, V. Sekar, F. Lin, N. Wang, T. Liu, and B. Sinopoli. *Cs2p: Improving video bitrate selection and adaptation with data-driven throughput prediction*. In Proceedings of the 2016 ACM SIGCOMM Conference, SIGCOMM '16, pages 272-285, New York, N.Y., USA, 2016. ACM.

MPC: MPC is a model-based hybrid adaptive bitrate algorithm that jointly considers the buffer length and previous throughput prediction records (computed in the same way as RB) to select the bitrate that maximizes the user quality of experience. Illustrated in Y. Xiaoqi, J. Abhishek, S. Vyas, and S. Bruno. *A control-theoretic approach for dynamic adaptive video streaming over http*. In Proceedings of the 2015 ACM Conference on Special Interest Group on Data Communication, SIGCOMM '15, pages 325-338, New York, N.Y., USA, 2015. ACM.

Pensieve: Pensieve jointly considers the buffer information and the previous throughput prediction records (computed in the same way as RB). The difference from MPC is that Pensieve uses the reinforcement learning based adaptive bitrate algorithm to select the bitrate and maximizes the user quality of experience measured by bitrate. Illustrated in M. Hongzi, N. Ravi, and A. Mohammad. *Neural adaptive video streaming with pensieve*. In Proceedings of the Conference of the ACM Special Interest Group on Data Communication, SIGCOMM '17, pages 197-210, New York, N.Y., USA, 2017. ACM.

In the tests/experiments, the video sources were chosen from DASH-IF and the dataset provided by H. Yeo, Y. Jung, J. Kim, J. Shin, and D. Han. *Neural adaptive content-aware internet video delivery*. In 13th USENIX Symposium on Operating Systems Design and Implementation (*OSDI* 18), pages 645-661, Carlsbad, Calif., 2018. USENIX Association. In total, these sources include 27 videos that can be divided into nine categories (Comedy, Cooking, Entertainment, Fashion, Games, Music, News, Sports, and Technology) and have wide spatial and temporal variations (e.g., high motion, high detail, etc.) suggested by Yeo et al. The length of each video is 300 seconds. All the videos are encoded by the widely used x265 codec with the original rate control scheme. The target bitrates are set to the actual bitrates obtained by compressing the same sequences at fixed QP values with non-RC HEVC encoding. The QP set of all videos is {41, 37, 33, 29, 25, and 21} at resolutions of {240p, 360p, 480p, 720p, 1080p, and 1080p}, and the frame rate is set to 24 fps. All the video sources are also used to generate a Zhou dataset (as in M. Zhou, X. Wei, S. Wang, S. Kwong, C. Fong, P. Wong, W. Yuen, and W. Gao. *SSIM-based global optimization for ctu-level rate control in hevc, IEEE Transactions on Multimedia*, pages 1-1, 2019) with the SSIM-based RC scheme. Each video sequence (with different bitrate/quality levels) is divided into 150 segments using MP4Box provided in *GPAC. Gpac: Multimedia open source project*, 2019. Each segment has a playback duration of 2 seconds. Four sets of parameter weights are selected for $(\alpha_{qoe}, \beta_{qoe}, \gamma_{qoe}, \delta_{qoe})$ to indicate three quality of experience objectives with various preferences, namely (2, 1, 1, 1), (1, 2, 1, 1), (1, 1, 2, 1), which respectively indicate maximising the quality of the received segment, reducing the quality temporal variations and minimizing the playback freezing length.

In the tests/experiments, Pensieve and the proposed algorithm are trained on the same x265 video datasets. Both the x265 and Zhou (as in M. Zhou, X. Wei, S. Wang, S. Kwong, C. Fong, P. Wong, W. Yuen, and W. Gao. *SSIM-based global optimization for ctu-level rate control in hevc, IEEE Transactions on Multimedia*, pages 1-1, 2019) datasets are used for performance testing. To evaluate the effectiveness of the proposed model, Pensieve and the proposed adaptive bitrate model are generated using the video contents across the nine content categories. In the proposed reinforcement learning based adaptive bitrate algorithm, the discount factor $\gamma=0.99$ and the learning rates $\alpha_{actor}$ and $\alpha_{critic}$ are set to $10^{-4}$ and $10^{-3}$, respectively. $\beta$ is decayed from 1 to 0.1 over $10^6$ iterations. In this example, the reinforcement learning algorithm was trained on an i7-8700 CPU with 32 GB of RAM. The proposed DDPG architecture was implemented using TensorFlow and TFLearn for both the training and testing procedures. Pensieve's parameter settings are the same as in M. Hongzi, N. Ravi, and A. Mohammad. *Neural adaptive video streaming with pensieve*. In Proceedings of the Conference of the ACM Special Interest Group on Data Communication, SIGCOMM '17, pages 197-210, New York, N.Y., USA, 2017. ACM.

The proposed DASH framework is evaluated using both real and synthetic network trace datasets. The real trace dataset consists of 400 traces from FCC broadband networks and 400 throughput traces from Norway's 3G/HSDPA network. The average throughput ranges from 300 kbps to 4,700 kbps, and each trace duration is 300 seconds. During training and testing, each trace is looped until the video has been completely downloaded. A total of 40% of the network traces were randomly selected for training, and the remainder were used for testing.

Additionally, to further evaluate the performance, synthetic network traces are generated based on the bandwidth profiles in M. Aguayo, L. Bellido, C. M. Lentisco, and E. Pastor. *Dash adaptation algorithm based on adaptive forgetting factor estimation, IEEE Transactions on Multimedia,* 20(5):1224-1232, May 2018. The synthetic network traces are also 300 seconds in duration, and they include both limited bandwidths with short-term fluctuations and high bandwidths with short-term fluctuations, making them suitable for evaluating the performances of different DASH adaptive bitrate algorithms. The network emulator "Mahimahi" in R. Netravali, A. Sivaraman, S. Das, A. Goyal, K. Winstein, J. Mickens, and H. Balakrishnan. *Mahimahi: Accurate record-and-replay for http. In Proceedings of the 2015 USENIX Conference on Usenix Annual Technical Conference, USENIXATC '15,* pages 417-429, Berkeley, Calif., USA, 2015. USENIX Association was used to create all the network traces.

The quality of experience gain of the real network trace test is compared. The detailed experimental results are shown in the table in FIG. 13, the table in FIG. 14, and FIGS. 15A-15C and FIGS. 16A-16C.

FIG. 13 is a table showing the quality of experience comparison in real network trace test with x265.

FIG. 14 is a table showing the quality of experience comparison in real network trace test with Zhou et al. (as in M. Zhou, X. Wei, S. Wang, S. Kwong, C. Fong, P. Wong, W. Yuen, and W. Gao. *SSIM-based global optimization for ctu-level rate control in hevc, IEEE Transactions on Multimedia,* pages 1-1, 2019).

Figure 15A:
FIG. 15A is a graph illustrating the performance of various existing methods and the method of the embodiment in the real network trace test of FIG. 13, where the quality of experience objective is (2, 1, 1, 1)
Figure 15B:
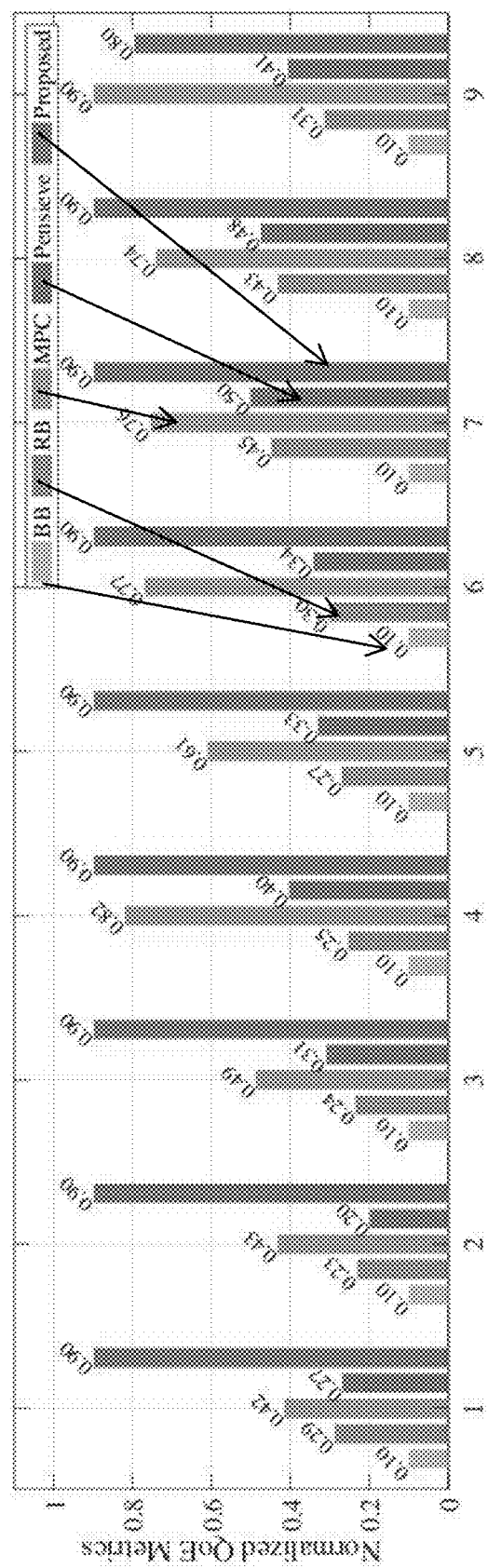
FIG. 15B is a graph illustrating the performance of various existing methods and the method of the embodiment in the real network trace test of FIG. 13, where the quality of experience objective is (1, 2, 1, 1)
Figure 15C:
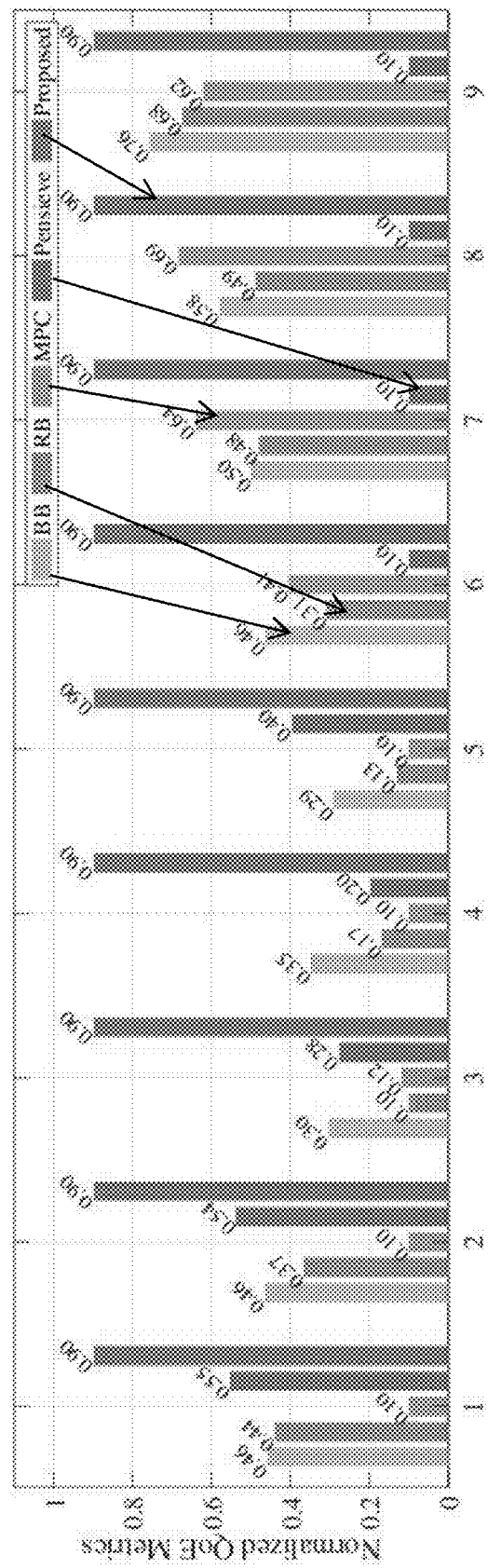
FIG. 15C is a graph illustrating the performance of various existing methods and the method of the embodiment in the real network trace test of FIG. 13, where the quality of experience objective is (1, 1, 2, 1)

FIGS. 15A to 15C show the normalized quality of experience comparison in real network trace test with x265 over various quality of experience objectives from the nine content categories. (1: Comedy, 2: Cooking, 3: Entertainment, 4: Fashion, 5: Games, 6: Music, 7: News, 8: Sports, and 9: Technology). FIG. 15A relates to a quality of experience objective of (2, 1, 1, 1); FIG. 15B relates to a quality of experience objective of (1, 2, 1, 1); FIG. 15C relates to a quality of experience objective of (1, 1, 2, 1).

Figure 16A:
FIG. 16A is a graph illustrating the performance of various existing methods and the method of the embodiment in the real network trace test of FIG. 14, where the quality of experience objective is (2, 1, 1, 1)
Figure 16B:
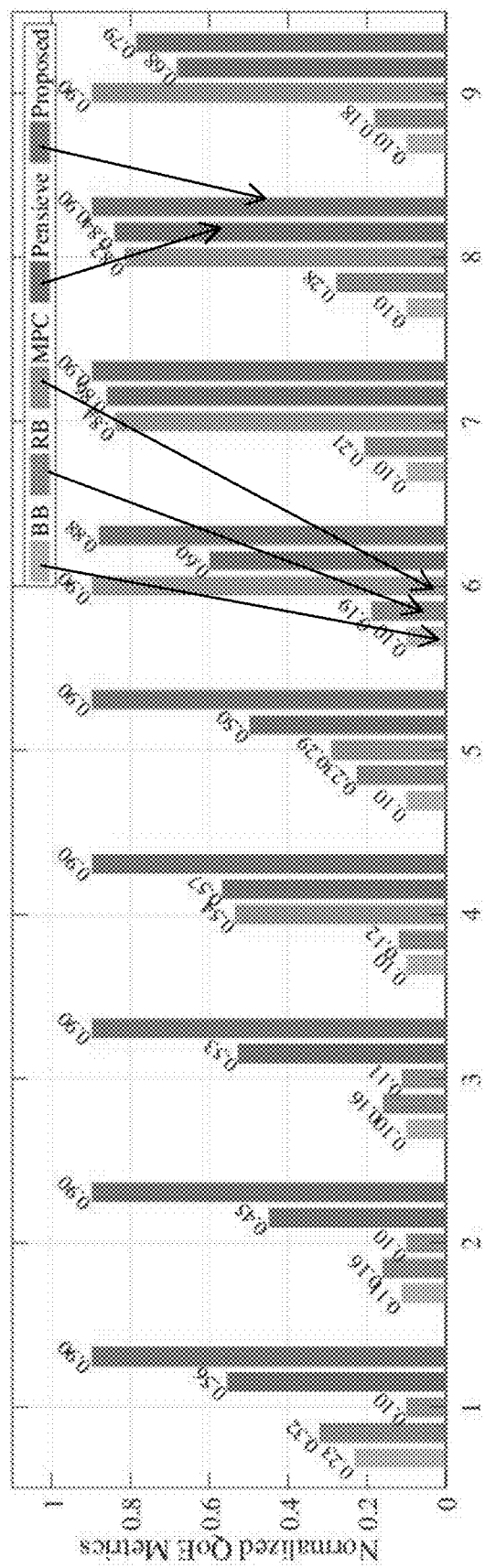
FIG. 16B is a graph illustrating the performance of various existing methods and the method of the embodiment in the real network trace test of FIG. 14, where the quality of experience objective is (1, 2, 1, 1)
Figure 16C:
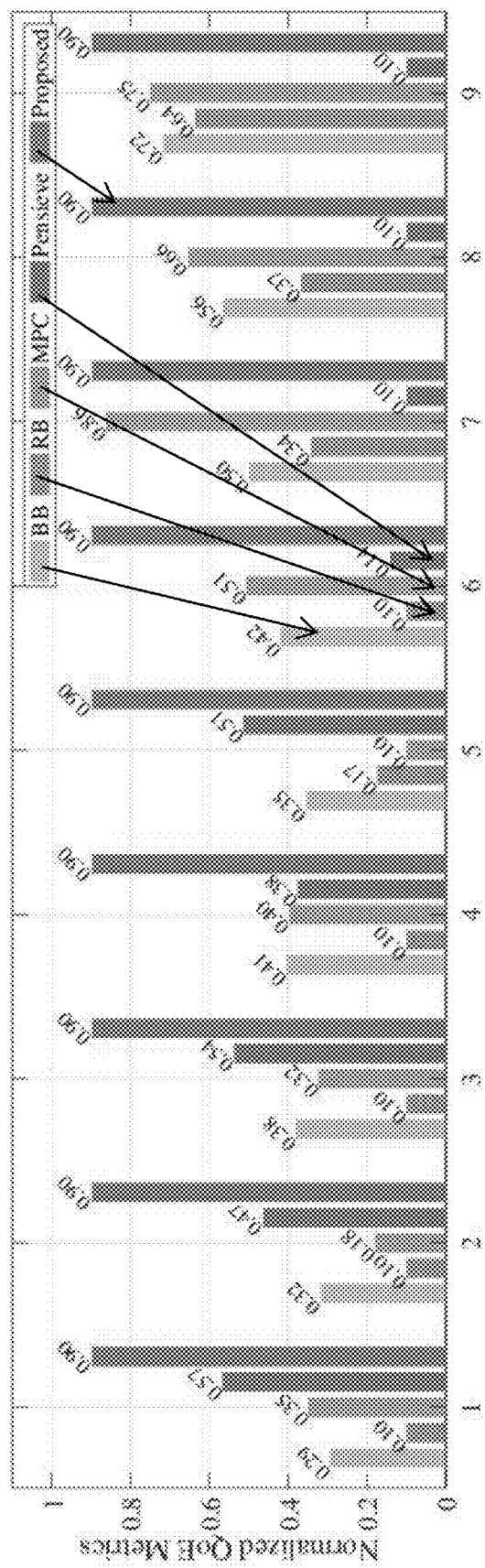
FIG. 16C is a graph illustrating the performance of various existing methods and the method of the embodiment in the real network trace test of FIG. 14, where the quality of experience objective is (1, 1, 2, 1)

FIGS. 16A to 16C show the normalized quality of experience comparisons of real network trace tests with Zhou et al. [48] over various quality of experience objectives from the nine content categories. (1: Comedy, 2: Cooking, 3: Entertainment, 4: Fashion, 5: Games, 6: Music, 7: News, 8: Sports, and 9: Technology). FIG. 16A relates to a quality of experience objective of (2, 1, 1, 1); FIG. 16B relates to a quality of experience objective of (1, 2, 1, 1); FIG. 16C relates to a quality of experience objective of (1, 1, 2, 1).

More specifically, FIGS. 15A-15C and FIGS. 16A-16C show the normalized average quality of experience factors (normalized to [0.1, 0.9]) of the video contents across the nine content categories after all the real network trace testing was completed with the x265 dataset and Zhou datasets. The numerical results of the tests are shown in the table in FIG. 13 and the table in FIG. 14. Due to space limitations, only the average quality of experience values for all the video contents are shown in the table in FIG. 13 and the table in FIG. 14.

In the x265 video dataset test, as illustrated in FIGS. 15A-15C, by jointly considering the multiple quality of experience metrics, the proposed algorithm achieves the highest quality of experience gain and the highest video quality with the lowest playback variation. The proposed reinforcement learning based method outperforms the other methods in terms of quality of experience gain because it fully considers the inherent variety of the video sequences and download events. The pre-built model-based BB algorithm uses the buffer length to control the bitrate selection of the next video segment; this technique achieves the best video bitrate. However, BB also results in the largest quality change levels, as shown in THE TABLE IN FIG. 13. RB attempts to predict only the network condition; thus, it provides the worst quality of experience. RB results in the lowest video playback stalling but it also has the lowest video quality. Both MPC and Pensieve use the quality of experience model to control DASH adaptive bitrate decisions. However, under the preset parameters, MPC cannot handle all the network conditions well. Meanwhile, without considering the video quality, MPC cannot guarantee high video quality with high video bitrate. With the embedding reinforcement learning method, Pensieve can handle all the conditions. However, it predicts network conditions using the same model as in RB, and the reinforcement learning model determines only the adaptive bitrate decision. Pensieve guarantees a higher video bitrate but fails to consider the video quality metrics. The reinforcement learning model in the proposed method jointly considers network prediction and the adaptive bitrate decision. The experimental results on the Zhou video dataset show that a stable and high-quality video dataset can further improve the quality of experience of DASH users (see the table in FIG. 14 and FIGS. 16A-16C). All the adaptive bitrate algorithms benefit from the Zhou dataset because they do not consider the inherent strong video bitrate/quality fluctuations that characterize video sequences. Meanwhile, the proposed algorithm achieves the highest quality of experience, the highest video quality, and the least playback stalling.

Synthetic network profiles are created to analyze the test algorithms' ability to address multiple abrupt bandwidth changes under normalized network traces. The detailed experimental results are shown in FIGS. 17A-17C and 18A-18C.

Figure 17C:
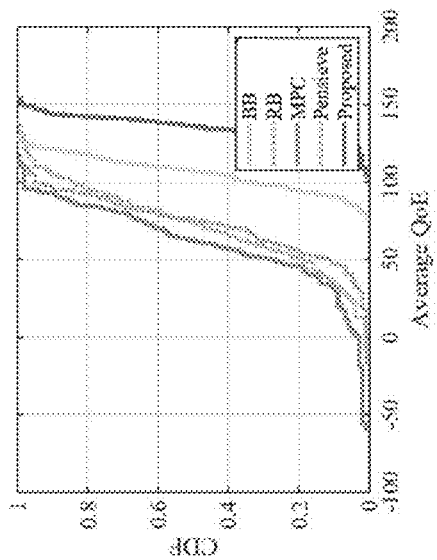
FIG. 17C is a graph illustrating the cumulative distribution function of average quality of experience value of various existing methods and the method of the embodiment in a synthetic network trace test, where the quality of experience objective is (1, 1, 2, 1)
Figure 17B:
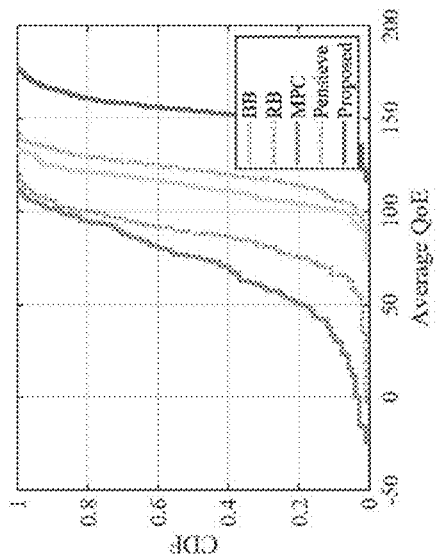
FIG. 17B is a graph illustrating the cumulative distribution function of average quality of experience value of various existing methods and the method of the embodiment in a synthetic network trace test, where the quality of experience objective is (1, 2, 1, 1)
Figure 17A:
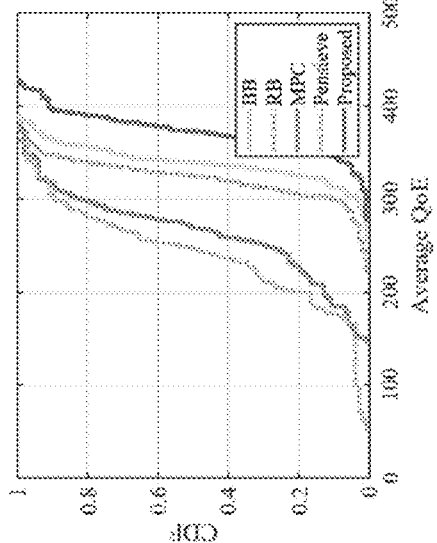
FIG. 17A is a graph illustrating the cumulative distribution function of average quality of experience value of various existing methods and the method of the embodiment in a synthetic network trace test, where the quality of experience objective is (2, 1, 1, 1)

FIGS. 17A to 17C show comparison of the average quality of experience value of cumulative distribution function (CDF) under three quality of experience objectives in synthetic network trace test with x265 dataset. FIG. 17A relates to a quality of experience objective of (2, 1, 1, 1); FIG. 17B relates to a quality of experience objective of (1, 2, 1, 1); FIG. 17C relates to a quality of experience objective of (1, 1, 2, 1).

Figure 18C:
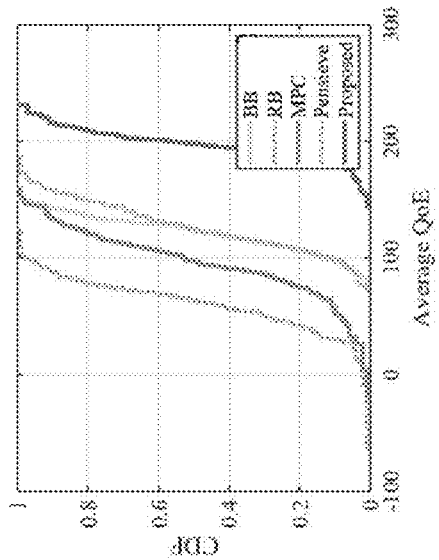
FIG. 18C is a graph illustrating the cumulative distribution function of average quality of experience value of various existing methods and the method of the embodiment in another synthetic network trace test, where the quality of experience objective is (1, 1, 2, 1)
Figure 18B:
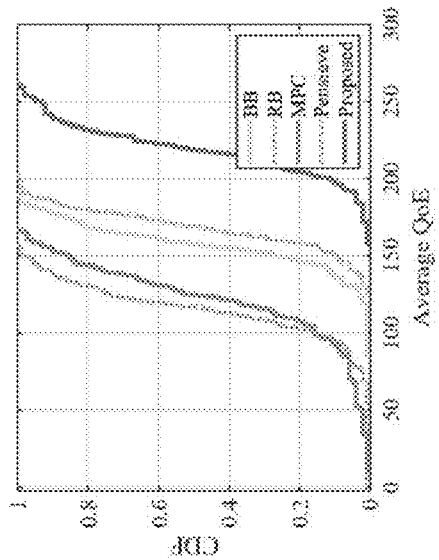
FIG. 18B is a graph illustrating the cumulative distribution function of average quality of experience value of various existing methods and the method of the embodiment in another synthetic network trace test, where the quality of experience objective is (1, 2, 1, 1)
Figure 18A:
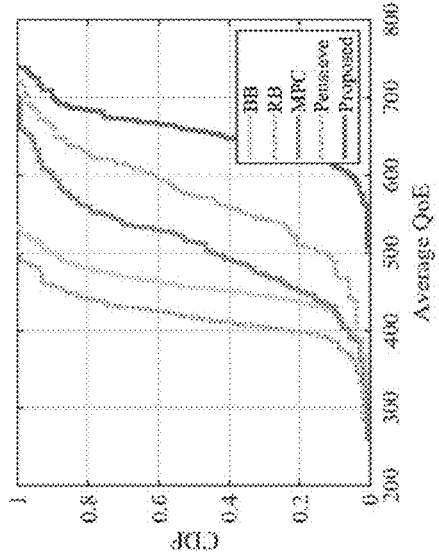
FIG. 18A is a graph illustrating the cumulative distribution function of average quality of experience value of various existing methods and the method of the embodiment in another synthetic network trace test, where the quality of experience objective is (2, 1, 1, 1)

FIGS. 18A to 18C show comparison of the average quality of experience value of cumulative distribution function (CDF) under three quality of experience objectives in synthetic network trace test on the Zhou dataset. FIG. 18A relates to a quality of experience objective of (2, 1, 1, 1); FIG. 18B relates to a quality of experience objective of (1, 2, 1, 1); FIG. 18C relates to a quality of experience objective of (1, 1, 2, 1).

Similar to the results of tests on real network traces, the proposed reinforcement learning based adaptive bitrate method achieves the highest quality of experience gain on both the x265 video dataset test and the Zhou datasets. The BB method produces the highest bitrate; however, as both FIGS. 17A and 18A show, its quality change frequency and amplitude are the highest. RB predicts only the network condition that obtains the worst quality of experience. The video playback stalling experienced under RB is the lowest but also results in the lowest video quality, as shown in FIGS. 17B and 18B. The playback stalling under the proposed method is almost identical to that of RB. The proposed DASH framework considers the inherent strong fluctuations that characteristic of both encoded video sequences and network traces. By providing a more stable and high-quality video set on the server side and embedding the quality-ofexperience-oriented reinforcement learning based adaptive bitrate algorithm on the client side, the proposed DASH framework provides high, stable video quality at a reasonable bitrate rather than guaranteeing a higher video bitrate.

Achieving fair usage of bandwidth suitable for bottlenecked networks is one objective of DASH adaptive bitrate optimization. The fairness metric determines whether the adaptation algorithm can ensure fair bandwidth sharing to different clients in a bottlenecked network. The fairness of the different algorithms has been evaluated. Both the real network trace and the synthetic bottleneck network trace datasets are used to evaluate the fairness. For the real network traces, 50 real network bottlenecked traces are generated by randomly selecting and summing 10 traces from the above-mentioned real FCC/Norway network trace dataset.

The table in FIG. 19 describes the synthetic bottleneck network trace used for the fairness analysis generated following the profiles in M. Aguayo, L. Bellido, C. M. Lentisco, and E. Pastor. *Dash adaptation algorithm based on adaptive forgetting factor estimation. IEEE Transactions on Multimedia,* 20(5):1224-1232, May 2018. During the experiment, ten clients initiate the DASH streaming service randomly within the first ten seconds. The results are obtained by measuring the average bitrate, SSIM and total quality of experience gain of each client in the interval [20 s, 320 s]. Jain's fair index (JFI) of user quality of experience, as in R. Jain, D.-M. Chiu, and W. Hawe. *A quantitative measure of fairness and discrimination for resource allocation in shared computer systems.* CoRR, cs.NI/9809099, 1998, is used to evaluate the fairness provided to users. JFI is obtained from the following equation:

$$JFI(QoE_1, \ldots, QoE_N) = \left(\sum_{i=1}^{N} QoE_i\right)^2 \bigg/ \left(N \sum_{i=1}^{N} QoE_i^2\right). \quad (19)$$

where N is the number of clients and $QoE_i$ is the quality of experience gain of the ith client.

The JFI results range from 1/N (completely unfair) to 1 (completely fair). The evaluation results are shown in the table in FIG. 20 (where the quality of experience Objective is (1, 2, 1, 1)). Unlike other adaptive bitrate algorithms, the proposed method is not bitrate-greedy. The proposed method properly consumes network bandwidth while maintaining video quality. The results show that the proposed method achieves fair bandwidth usage and is thus suitable for bottlenecked networks. The results also show that the proposed DASH framework outperforms the some existing frameworks by achieving higher video quality at lower bandwidth cost.

Figure 21:
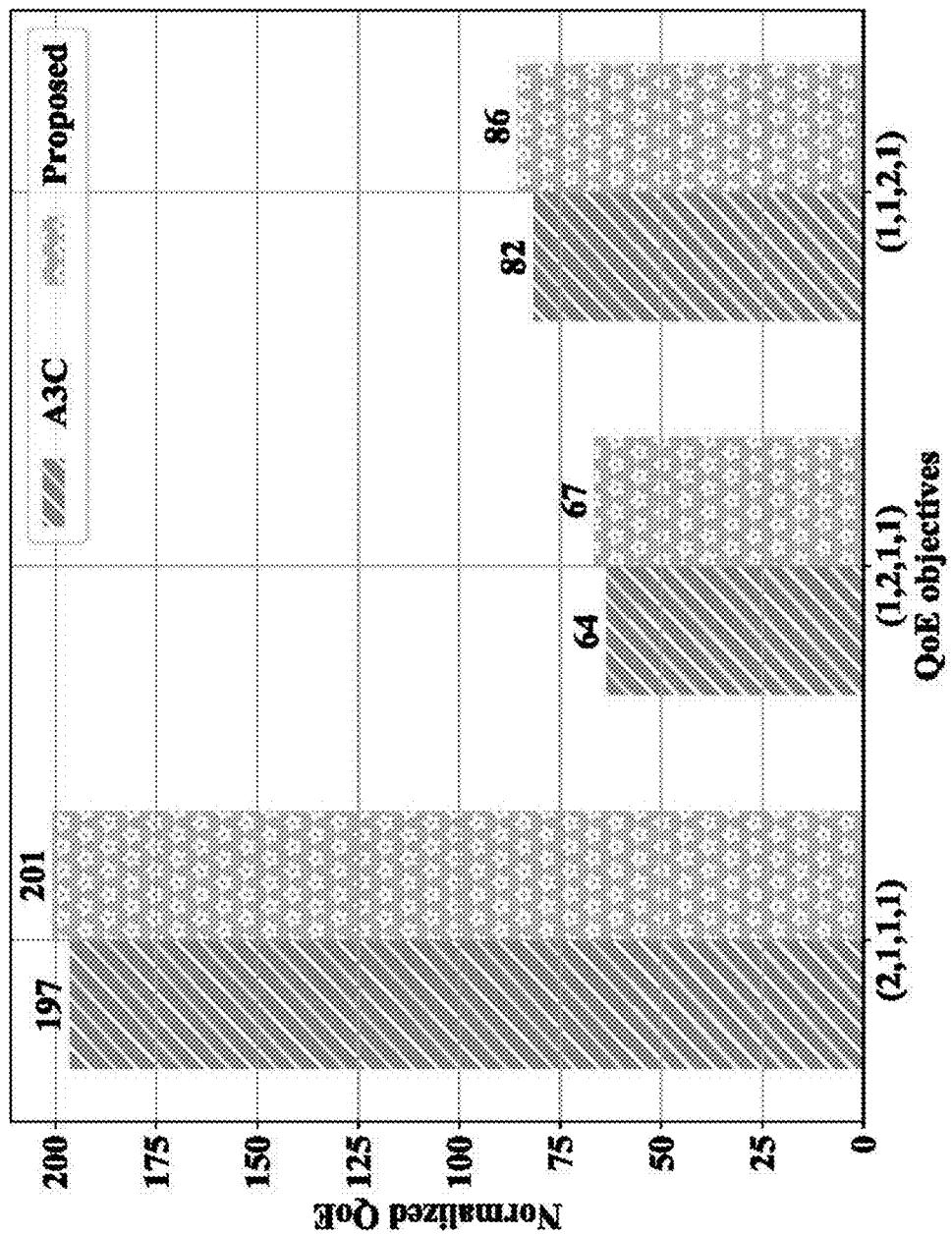
FIG. 21 is a graph showing the quality of experience comparison between an existing A3C method and the method of none embodiment over the quality of experience objectives (2, 1, 1, 1), (1, 2, 1, 1), and (1, 1, 2, 1).

To evaluate the effect of the proposed continuous bitrate/quality control method, a comparison is made with A3C (illustrated in V. Mnih, A. P. Badia, M. Mirza, A. Graves, T. P. Lillicrap, T. Harley, D. Silver, and K. Kavukcuoglu. *Asynchronous methods for deep reinforcement learning.* CoRR, abs/1602.01783, 2016), which has a discretization limit, to demonstrate that the proposed approach of the present embodiment is a more appropriate model for this task. In the experiment, A3C has the same neural network architecture and the same number of network parameters. The action space of A3C is based on the input available quality set $\{U_i\}$. The performance on three quality of experience objectives are evaluated for each reinforcement learning structure by replacing the reinforcement learning based model. The results are shown in FIG. 21. The action space limitation of the A3C method means that it is unable to effectively address changes in the action space. Because the proposed DDPG adaptive bitrate decision model fully considers the bitrate limitations and quality discretization, on average, it yields higher precision when optimizing various quality of experience objectives.

The above embodiments of the invention have provided, generally, systems and methods for streaming video. The more specific embodiments presented with reference to FIGS. 6-21 may be implementations of the more general embodiments presented with reference to FIGS. 1-5. Some embodiments of the invention have provided a quality-of-experience-oriented reinforcement learning based DASH streaming framework to further improve DASH system adaptability and user quality of experience. The reinforcement learning algorithm is carefully designed and properly trained and presents improvement over some existing methods. As the reinforcement learning based adaptive bitrate algorithm jointly considers the video quality and playback buffer status, the quality of experience oriented DASH framework in some embodiments outperform some existing approaches by a noticeable margin in terms of both temporal and visual quality of experience factors while simultaneously guaranteeing application-level fairness when multiple clients share a bottlenecked network in constrained industrial scenarios.

The above embodiments in FIGS. 6-21 have provided, among other things, one or more of, e.g., (1) A reinforcement-learning-based quality of experience-oriented dynamic adaptive streaming framework that improves streaming performance is constructed. This framework generalizes to various streaming services.

(2) The DASH adaptive bitrate selection problem is formulated as a Markov decision process (MDP) problem, and a reinforcement learning based adaptive bitrate method is used to solve the MDP problem. In the proposed algorithm, the DASH client acts as the reinforcement learning agent, and the network variation acts as the environment.

(3) In the proposed algorithm, video quality and bitrate, client buffer status, and playback freezing issues are adopted as reinforcement learning input, while the proposed user quality of experience, which jointly considers the video quality and buffer status, is used as the reward. The proposed reinforcement learning based adaptive bitrate algorithm can then be embedded in the proposed DASH framework.

(4) Without relying on predicted network conditions, a video quality-related reinforcement learning input state and reward function including spatial quality, smooth loss, playback freezing loss, and playback smoothness loss is devised.

(5) The quality-related learning framework can be extended to other streaming tasks.

For example, the above embodiments of the invention may improve streaming performance (e.g., DASH streaming performance) and/or enable reinforcement learning strategies available for quality control when the network conditions are limited. The above embodiments of the invention may not require predicted network conditions for training, and thus avoids the risk of overfitting on specific data. The proposed video quality-related input state in the above embodiments can be used in other streaming tasks, e.g., where no predicted data are available. The proposed video quality-related reward function in the above embodiments can be used in other streaming tasks, e.g., where no predicted data are available. The system and methods of some of the above embodiments can be applied to DASH streaming products relatively easily. These products may include set-top-boxes (STBs), mobile devices, televisions, streaming service, etc.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Feature(s) in one aspect or embodiment and feature(s) in another one or more different aspects or embodiments may be combined as necessary and applicable to provide further aspect(s) or embodiment(s) of the invention. The method illustrated may be performed using the system illustrated or other systems not illustrated.

The invention claimed is:

1. A method for adaptively streaming a video, comprising:
   obtaining a first segment of a video file with a first bitrate and video quality level;
   after obtaining the first segment of the video file, determining, using a controller with a trained reinforcement-learning-based adaptive streaming model, a second bitrate and video quality level of a second segment of the video file to be obtained; and
   obtaining the second segment of the video file with the second determined bitrate and video quality level;
   wherein the first and second segments of the video file are consecutive and/or continuous segments of a video represented by the video file;
   wherein the trained reinforcement-learning-based adaptive streaming model is trained based at least in part on a reward function associated with a quality of experience of a viewer of the video; and
   wherein the reward function is defined as:

$$\alpha_{qoe} vq_i - \beta_{qoe} |vq_i - vq_{i-1}| - \gamma_{qoe} F_i - \delta_{qoe} FRP_i$$

where $\alpha_{qoe}$, $\beta_{qoe}$, $\gamma_{qoe}$ and $\delta_{qoe}$ are weighting parameters, $vq_i$ is video quality level of the $i^{th}$ video segment, $|vq_i - vq_{i-1}|$ is video quality level variation between adjacent $i^{th}$ and $i-1^{th}$ video segments, $FRP_i$ is a freezing risk penalty parameter, and $F_i$ is freezing length or time, such that the reward function takes into account, at least, video quality level of a segment of the video file, video quality level variations between adjacent segments, and playback freezing events and applies respective weightings to the video quality level of a segment of the video file, the video quality level variations between adjacent segments, and the playback freezing events.

2. The method of claim 1, wherein the determining comprises:
   detecting parameters related to segment download state and playback state associated with the video file; and
   processing the detected parameters using the trained reinforcement-learning-based adaptive streaming model to determine the second bitrate and video quality level.

3. The method of claim 2, wherein the parameters comprise one or more of:
   video quality level of the obtained first segment;
   current buffer length or time;
   current freezing length or time;
   download time required and corresponding bitrate for past duration of the video represented by the video file; and
   available video quality level set and available bitrate set of the second segment.

4. The method of claim 2, wherein the parameters comprise:
   video quality level of the obtained first segment;
   current buffer length or time;
   current freezing length or time;
   download time required and corresponding bitrate for past duration of the video represented by the video file; and
   available video quality level set and available bitrate set of the second segment.

5. The method of claim 1, wherein the trained reinforcement-learning-based adaptive streaming model is trained or established using a deep deterministic policy gradient based algorithm.

6. The method of claim 1, wherein the first and second determined video quality levels are each represented by structural similarity index or indices.

7. The method of claim 1,
   wherein the first video quality level is represented by an average structural similarity index of the first segment; and
   wherein the second determined video quality level is represented by an average structural similarity index of the second segment.

8. The method of claim 1, further comprising:
   processing the obtained first segment of the video file; and
   playing, based on the processing, the first segment of the video.

9. The method of claim 8, wherein the processing and/or playing are performed at least partly during the determination of the second bitrate and video quality level of the second segment of the video file to be obtained.

10. The method of claim 8, further comprising:
    processing the obtained second segment of the video file; and
    playing, based on the processing, the second segment of the video.

11. The method of claim 1, further comprising:
    parsing a media presentation description file including records of properties of the video file;
    wherein the media presentation description file contains, at least, records of available bitrates and video quality levels for each predetermined duration of a video represented by the video file.

12. The method claim 11, further comprising receiving the media presentation description file prior to parsing.

13. The method of claim 1, wherein the adaptive streaming of the video is performed using dynamic Adaptive Streaming over HTTP (DASH).

14. A system for adaptively streaming a video, comprising:
one or more client devices arranged to:
obtain a first segment of a video file with a first bitrate and video quality level;
determine, using a controller with a trained reinforcement-learning-based adaptive streaming model, a second bitrate and video quality level of a second segment of the video file to be obtained after the first segment of the video file is obtained; and
obtain the second segment of the video file with the second determined bitrate and video quality level;
wherein the first and second segments of the video file are consecutive and/or continuous segments of a video represented by the video file;
wherein the trained reinforcement-learning-based adaptive streaming model is trained based at least in part on a reward function associated with a quality of experience of a viewer of the video; and
wherein the reward function is defined as:

$$\alpha_{qoe}vq_i - \beta_{qoe}|vq_i - vq_{i-1}| - \gamma_{qoe}F_i - \delta_{qoe}\text{FRP}_i,$$

where $\alpha_{qoe}$, $\beta_{qoe}$, $\gamma_{qoe}$ and $\delta_{qoe}$ are weighting parameters, $vq_i$ is video quality level of the $i^{th}$ video segment, $|vq_i - vq_{i-1}|$ is video quality level variation between adjacent $i^{th}$ and $i-1^{th}$ video segments, $\text{FRP}_i$ is a freezing risk penalty parameter, and $F_i$ is freezing length or time, such that the reward function takes into account, at least, video quality level of a segment of the video file, video quality level variations between adjacent segments, and playback freezing events and applies respective weightings to the video quality level of a segment of the video file, the video quality level variations between adjacent segments, and the playback freezing events.

15. The system of claim 14, wherein the one or more client devices are arranged to determine the second bitrate and video quality level of the second segment of the video file to be obtained by:
detecting parameters related to segment download state and playback state associated with the video file; and
processing the detected parameters using the trained reinforcement-learning-based adaptive streaming model to determine the second bitrate and video quality level.

16. The system of claim 15, wherein the parameters comprises one or more of:
video quality level of the obtained first segment;
current buffer length or time;
current freezing length or time;
download time required and corresponding bitrate for past duration of the video represented by the video file; and
available video quality level set and available bitrate set of the second segment.

17. The system of claim 15, wherein the parameters comprise:
video quality level of the obtained first segment;
current buffer length or time;
current freezing length or time;
download time required and corresponding bitrate for past duration of the video represented by the video file; and
available video quality level set and available bitrate set of the second segment.

18. The system of claim 14, wherein the one or more client devices are arranged to receive user input to adjust one or more of the weightings.

19. The system of claim 14,
wherein the first video quality level is represented by an average structural similarity index of the first segment; and
wherein the second determined video quality level is represented by an average structural similarity index of the second segment.

20. The system of claim 14, wherein the one or more client devices and/or one or more video players associated with the one or more client devices are further arranged to:
process the obtained first segment of the video file; and
play, based on the processing, the first segment of the video.

21. The system of claim 20, wherein the one or more client devices and/or the one or more video players are arranged to perform the processing and/or playing at least partly during the determination of the second bitrate and video quality level of the second segment of the video file to be obtained.

22. The system of claim 21, wherein the one or more client devices and/or one or more video players associated with the one or more client devices are further arranged to:
process the obtained second segment of the video file; and
play, based on the processing, the second segment of the video.

23. The system of claim 14, wherein the adaptive streaming of the video is performed using dynamic Adaptive Streaming over HTTP (DASH).

24. A method for adaptively streaming a video, comprising:
after obtaining a segment of a video file with a determined bitrate and video quality level, determining, using a controller with a trained reinforcement-learning-based adaptive streaming model, bitrate and video quality level of the next segment of the video file to be obtained;
obtaining the next segment of the video file with the determined bitrate and video quality level determined for the next segment;
repeating the determining and obtaining steps for all subsequent segments of the video file so as to adaptively stream a video represented by the video file;
wherein the trained reinforcement-learning-based adaptive streaming model is trained based at least in part on a reward function associated with a quality of experience of a viewer of the video; and
wherein the reward function is defined as:

$$\alpha_{qoe}vq_i - \beta_{qoe}|vq_i - vq_{i-1}| - \gamma_{qoe}F_i - \delta_{qoe}\text{FRP}_i,$$

where $\alpha_{qoe}$, $\beta_{qoe}$, $\gamma_{qoe}$ and $\delta_{qoe}$ are weighting parameters, $vq_i$ is video quality level of the $i^{th}$ video segment, $|vq_i - vq_{i-1}|$ is video quality level variation between adjacent $i^{th}$ and $i-1^{th}$ video segments, $\text{FRP}_i$ is a freezing risk penalty parameter, and $F_i$ is freezing length or time, such that the reward function takes into account, at least, video quality level of a segment of the video file, video quality level variations between adjacent segments, and playback freezing events and applies respective weightings to the video quality level of a segment of the video file, the video quality level variations between adjacent segments, and the playback freezing events.

25. A system for adaptively streaming a video, comprising:

one or more client devices arranged to:
- obtain a segment of a video file with a determined bitrate and video quality level;
- determine, using a controller with a trained reinforcement-learning-based adaptive streaming model, bitrate and video quality level of the next segment of the video file to be obtained;
- obtain the next segment of the video file with the determined bitrate and video quality level determined for the next segment; and
- repeat the determination and obtain steps for all subsequent segments of the video file so as to adaptively stream a video represented by the video file;

wherein the trained reinforcement-learning-based adaptive streaming model is trained based at least in part on a reward function associated with a quality of experience of a viewer of the video; and wherein the reward function is defined as:

$$\alpha_{qoe} vq_i - \beta_{qoe}|vq_i - vq_{i-1}| - \gamma_{qoe} F_i - \delta_{qoe} FRP_i,$$

where $\alpha_{qoe}$, $\beta_{qoe}$, $\gamma_{qoe}$ and $\delta_{qoe}$ are weighting parameters, $vq_i$ is video quality level of the $i^{th}$ video segment, $|vq_i - vq_{i-1}|$ is video quality level variation between adjacent $i^{th}$ and $i-1^{th}$ video segments, $FRP_i$ is a freezing risk penalty parameter, and $F_i$ is freezing length or time, such that the reward function takes into account, at least, video quality level of a segment of the video file, video quality level variations between adjacent segments, and playback freezing events and applies respective weightings to the video quality level of a segment of the video file, the video quality level variations between adjacent segments, and the playback freezing events.

26. The method of claim 24, wherein the adaptive streaming of the video is performed using dynamic Adaptive Streaming over HTTP (DASH).

27. The system of claim 25, wherein the adaptive streaming of the video is performed using dynamic Adaptive Streaming over HTTP (DASH).

* * * * *